(12) United States Patent
Kumakawa

(10) Patent No.: US 8,087,703 B2
(45) Date of Patent: Jan. 3, 2012

(54) COMPONENT CONNECTING STRUCTURE

(75) Inventor: Yasushi Kumakawa, Kanagawa (JP)

(73) Assignee: Piolax Inc., Yokohama-shi (JP)

( * ) Notice: Subject to any disclaimer, the term of this patent is extended or adjusted under 35 U.S.C. 154(b) by 153 days.

(21) Appl. No.: 12/105,958

(22) Filed: Apr. 18, 2008

(65) Prior Publication Data

US 2008/0258462 A1   Oct. 23, 2008

(30) Foreign Application Priority Data

Apr. 20, 2007   (JP) .................................. 2007-111770
Aug. 1, 2007    (JP) .................................. 2007-200967

(51) Int. Cl.
*F16L 23/00*    (2006.01)
(52) U.S. Cl. .......... 285/406; 285/364; 285/420; 24/20 R
(58) Field of Classification Search .................. 285/364, 285/365, 406, 407, 408, 409, 420, 921; 24/20 CW, 24/20 R
See application file for complete search history.

(56) References Cited

U.S. PATENT DOCUMENTS

| 2,876,514 | A | * | 3/1959 | Murphy | 24/20 R |
| 3,479,069 | A | * | 11/1969 | Sedam | 285/364 |
| 3,881,753 | A | * | 5/1975 | Bochory | 285/82 |
| 3,945,669 | A | * | 3/1976 | Bochory | 285/82 |
| 4,773,129 | A | * | 9/1988 | Muhr | 24/20 R |
| 4,858,279 | A | * | 8/1989 | Kato et al. | 24/20 R |
| 4,882,814 | A | * | 11/1989 | Takahashi | 24/20 R |
| 4,930,192 | A | * | 6/1990 | Muhr | 24/20 R |
| 5,185,907 | A | * | 2/1993 | Kawashima et al. | 24/20 R |
| 5,537,721 | A | * | 7/1996 | Oetiker | 24/20 R |
| 5,615,457 | A | * | 4/1997 | Steinkonig | 24/20 R |
| 5,819,376 | A | * | 10/1998 | Kovalsky et al. | 24/23 R |
| 6,530,609 | B1 | * | 3/2003 | Chatterton | 285/420 |
| 2004/0017084 | A1 | * | 1/2004 | Konno et al. | 285/403 |
| 2004/0111840 | A1 | * | 6/2004 | Gyongyosi et al. | 24/20 R |
| 2005/0138778 | A1 | * | 6/2005 | Oetiker et al. | 24/20 R |
| 2006/0066103 | A1 | * | 3/2006 | Auchter et al. | 285/420 |
| 2007/0152444 | A1 | * | 7/2007 | Kertesz et al. | 285/406 |

FOREIGN PATENT DOCUMENTS

| JP | 58-9587 A | 1/1983 |
| JP | 7-119589 A | 5/1995 |
| JP | 10-288134 A | 10/1998 |

* cited by examiner

*Primary Examiner* — Michael P Ferguson
*Assistant Examiner* — Gwendolyn Driggers
(74) *Attorney, Agent, or Firm* — Westerman, Hattori, Daniels & Adrian, LLP

(57) ABSTRACT

A component connecting structure includes a first component having a flange portion, a second component having a flange portion, and a clip for holding the flange portions in a butted state. The clip formed into a generally polygonal shape has a spring body having first and second circumferential end portions overlapped with each other in a diameter reduced free state. The spring body has slits for inserting the flange portions butted against each other in the diameter reduced free state. The first and second circumferential end portions have a temporary engaging protrusion and a temporary engaging ledge, respectively. The temporary engaging ledge is engaged with the temporary engaging protrusion to hold a diameter expanded state of the spring body.

14 Claims, 17 Drawing Sheets

COMPONENT CONNECTING STRUCTURE

This application claims priority under 35 U.S.C. §119 to Japanese Patent Applications No. 2007-111770 filed on Apr. 20, 2007 and No. 2007-200967 filed on Aug. 1, 2007, the entire disclosures of which are incorporated herein by reference in their entireties.

BACKGROUND OF THE INVENTION

1. Field of the Invention

The present invention relates to a component connecting structure, more particularly to a component connecting structure for connecting a component, such as, e.g., a pressure regulator or a pulsation dumper for use in an automobile internal-combustion engine, to another component, such as, e.g., a fuel pile.

2. Description of Related Art

The following description sets forth the inventor's knowledge of related art and problems therein and should not be construed as an admission of knowledge in the prior art. A fuel pipe is connected to an intake manifold for supplying a fuel to each cylinder of an automobile internal-combustion engine. To this fuel pile, a pressure regulator for keeping a fuel pressure constant, a pulsation dumper and the like are further connected. Conventionally, there have been proposed several methods for attaching a component such as a pressure regulator to a component such as a fuel pipe.

Japanese Unexamined Laid-open Patent Publication No. H07-119589 (hereinafter referred to as "Patent Document 1", discloses a pressure regulator mounting structure in which a pressure regulator is attached to the vicinity of a fuel injector positioned at the fuel inlet side end portion of the fuel pipe. The regulator has a mounting flange at the case external periphery thereof. The regulator is secured to the fuel pipe via the mounting flange with bolts.

Japanese Unexamined Laid-open Patent Publication No. H10-288134 (hereinafter referred to as "Patent Document 2") discloses a pressure regulator mounting structure in which a pressure regulator main body is coaxially inserted into a pipe space of a fuel pipe. The fuel pipe has a flange portion extended from the end periphery thereof and a cylindrical flange extended portion extended from the flange portion. In the opposed peripheral walls of the flange extended portion, a pair of engaging holes each having a predetermined width are formed. In this mounting structure, the regulator is secured to the fuel pipe as follows. The lower portion of the regulator main body is inserted into the fuel pipe to bring the flange portion of the regulator into contact with the flange portion of the pipe. While keeping this state, a generally U-shaped clamp is inserted into one of the pair of engaging holes formed in the flange extended portion to pinch the upper portion of the regulator main body with the longitudinal intermediate portion of the clamp in a state in which one end of the clamp is engaged with one of the engaging holes and the other end thereof is engaged with the other engaging hole.

Japanese Unexamined Laid-open Utility Model Publication No. S58-9587 (hereinafter referred to as "Patent Document 3") discloses a connecting structure for connecting a pair of tubular members although the structure is not directed to a connecting structure for connecting a regulator to a fuel pipe. In this connecting structure, flange portions of tubular members are butted against with each other and the flange portions are secured with a clip member. The clip member is formed by bending a spring plate into a generally triangular shape, and has slits formed in each side and curled engaging portions at both end portions. In connecting tubular members using this clip member, this clip member is opened and fitted on the tubular members in a state in which both the flange portions of the tubular members butted against with each other are fitted in the slits and one of the curled engaging portions is engaged with the other curled engaging portion. Thus, the pair of tubular members are connected with both ends of the clip member engaged each other. Patent Document 3 also discloses a clip member formed by bending a spring plate into a wavy star shape having outwardly bent end portions. This clip member is used to connect a pair of tubular members with flange portions of both the tubular members fitted in slits formed in the spring plates.

In the case of the mounting structure proposed by Patent Document 1, the mounting operation is complicated and poor in workability since the fuel pipe and the regulator are secured using bolts. In the case of the mounting structure proposed by Patent Document 2, it is required to form a pair of engaging holes in the flange extended portion extended from the flange portion of the pipe end portion, causing a complicated structure, which in turn results in increased production cost.

In the case of the connecting structure proposed by Patent Document 3, it is required to engage the curled engaging portions formed at both end portions with each other in connecting a pair of tubular members using the generally triangular shaped clip member. Thus, the attaching operation of the clip member is troublesome. In the case of connecting tubular members using the generally star-shaped clip member, it is not required to engage the end portions thereof with each other. However, since both end portions are opened, when a large external force is applied to the clip member in the radial direction thereof, the clip member can be detached from the tubular members due to the existence of the opened end.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a component connecting structure capable of easily connecting one component to the other component, easily releasing the connection and reducing the production cost.

According to a first aspect of a preferred embodiment of the present invention, a component connecting structure comprises a first component having a flange portion, a second component having a flange portion, and a clip for holding both the flange portions in a butted manner so as not to be detached from each other, wherein the clip is formed into a generally polygonal shape by bending a plate spring at plural folding lines, and has a spring body having a first circumferential end portion and a second circumferential end portion, the second circumferential end portion being overlapped with the first circumferential end portion by a predetermined length along a circumferential direction in a diameter reduced free state of the clip, wherein the spring body is provided with slits extending in a circumferential direction for inserting the flange portions of both the first and second components butted against each other in the diameter reduced free state, wherein the first circumferential end portion is provided with a temporary engaging protrusion extended from a widthwise side thereof, and the second circumferential end portion is provided with a temporary engaging ledge extended from a widthwise side thereof, and wherein the temporary engaging protrusion and the temporary engaging ledge are directly or indirectly engageable with each other when the spring body is expanded in diameter to hold a diameter expanded state of the spring body.

According to a second aspect of a preferred embodiment of the present invention, a component connecting structure comprises a first component having a flange portion, a second component having a flange portion, and a clip for holding both the flange portions in a butted manner so as not to be detached from each other, wherein the clip is formed into a generally polygonal shape by bending a plate spring at plural folding lines, and has a spring body having a first circumferential end portion and a second circumferential end portion, the second circumferential end portion being overlapped with the first circumferential end portion by a predetermined length along a circumferential direction in a diameter reduced free state of the clip, wherein the spring body is provided with slits extending in a circumferential direction for inserting the flange portions of both the first and second components butted against each other in the diameter reduced free state, wherein the first circumferential end portion is provided with a temporary engaging protrusion extended from a widthwise side thereof in a widthwise direction, and wherein the second circumferential end portion is provided with a temporary engaging ledge extended radially outwardly or radially inwardly from a widthwise side thereof toward the first circumferential end portion, the temporary engaging ledge being configured to hold a diameter expanded state of the spring body by being engaged with the temporary engaging protrusion when the spring body is expanded in diameter.

With this component connecting structure, the clip can be kept in a diameter expanded state by expanding the diameter of the spring body of the clip against its resilient force and engaging the temporary engaging ledge with the temporary engaging protrusion of the first circumferential end portion. From this diameter expanded state, by releasing the engagement between the temporary engaging protrusion and the temporary engaging ledge after mounting the clip on the outer peripheries of the components with the flange portions of the first component and the second component butted against each other and with the slits aligned with the flange portions, the spring body will be reduced in diameter to cause insertions of the flange portions of both the components in the slits, to thereby fix both the components via with clip.

As explained above, with this component connecting structure, by temporarily holding the diameter expanded state of the clip, both the components can be connected by simply disposing the clip on the outer peripheries of the flange portions butted against each other, positioning the flange portions so as to be aligned with the slits and then releasing the engagement between the temporary engaging protrusion and the temporary engaging ledge.

In the diameter decreased state of the spring body, both the circumferential end portions are overlapped with each other. Therefore, even if a radially outward external force is applied to the clip, the clip is hardly detached from both the components. Furthermore, since the first component and the second component each can be a simple structure having a flange portion, the production cost thereof can be reduced.

According to a third aspect of a preferred embodiment of the present invention, in the second aspect of the component connecting structure, one of the first circumferential end portion and the second circumferential end portion is provided with an engaging hole, and the other of the first circumferential end portion and the second circumferential end portion is provided with an engaging ledge protruded in a direction toward the one of the first circumferential end portion and the second circumferential end portion and in a direction getting away from a tip end portion of the other circumferential end portion, the engaging ledge being configured to be inserted in the engaging hole when the spring body is reduced in diameter.

With this component connecting structure, when the spring body is reduced in diameter, the engaging ledge formed at the other of the first circumferential end portion and the second circumferential end portion will be engaged with the engaging hole formed in the one of the first circumferential end portion and the second circumferential end portion. Therefore, when an external force for expanding the diameter of the spring body is applied to the spring body in the circumferential direction, the engaging ledge will be engaged with the peripheral edge of the engaging hole to keep the spring body in a diameter reduced state.

According to a fourth aspect of a preferred embodiment of the present invention, in the third aspect of a preferred embodiment of the present invention, the one of the first circumferential end portion and the second circumferential end portion is disposed on an outer peripheral side of the other of the first circumferential end portion and the second circumferential end portion, and the engaging ledge is formed so as to obliquely outwardly protrude from an end portion of the one of the first circumferential end portion and the second circumferential end portion in a state in which the spring body is expanded in diameter with the temporary engaging protrusion engaged with the temporary engaging ledge.

With this component connecting structure, in a state in which the spring body is expanded in diameter and the temporary engaging protrusion is engaged with the temporary engaging ledge, the engaging ledge protrudes obliquely outwardly from the end portion of the one of the circumferential end portions. Therefore, by pressing the engaging ledge from the one of the circumferential end portion, the engagement between the temporary engaging protrusion and the temporary engaging ledge can be easily released, resulting in improved workability.

Furthermore, when the spring body is reduced in diameter, the spring body is reduced in diameter while sliding the engaging ledge obliquely outwardly extended from the other circumferential end portions on the other circumferential end portion so that the other of the circumferential portions moves toward the inside of the one of the circumferential end portions. This prevents hitting of the other circumferential end portion against the operator's finger.

According to a fifth aspect of a preferred embodiment of the present invention, in the second aspect of a preferred embodiment of the present invention, the temporary engaging ledge is provided at each of both widthwise sides of the second circumferential end portion, and a portion of the first circumferential end portion where the temporary engaging ledges are positioned in a diameter reduced state of the spring body is formed to have a width capable of being inserted between the temporary engaging ledges.

With this component connecting structure, since the portion of the first circumferential end portion where the temporary engaging ledges are positioned in a diameter reduced state of the spring body will be positioned between both the temporary engaging ledges, axial displacements of both the circumferential end portions can be prevented, resulting in secure holding of the flange portions of both the components.

At the time of reducing the diameter of the clip by releasing the engagement between the temporary engaging protrusion and the temporary engaging ledge from the temporarily diameter expanded state of the clip, the corresponding portion of the first circumferential end portion will be introduced between the temporary engaging ledges of the second circumferential end portion while being guided by the temporary engaging ledges. Thus, the spring body can be reduced in diameter smoothly without causing axial displacement of both the circumferential end portions of the spring body.

According to a sixth aspect of a preferred embodiment of the present invention, in any one of the second to fifth aspects of a preferred embodiment of the present invention, a protruded ledge is radially inwardly extended from one side edge of the slit, and the protruded ledge has a protruded height which does not allow passing of the flange portions in a diameter expanded state of the spring body with the temporary engaging protrusion engaged with the temporary engaging ledge and does not cause pressing of the protruded ledge against an outer periphery of a main body of the component in a diameter reduced state of the spring body.

With this component connecting structure, when the clip is mounted on the outer peripheries of the components in a state in which the spring body is expanded in diameter with the temporary engaging protrusion engaged with the temporary engaging ledge, the protruded ledges are engaged with the flange portion. Therefore, the clip can be easily set such that the flange portions are aligned with the slits.

At the time of reducing the diameter of the spring body by releasing the engagement between the temporary engaging protrusion and the temporary engaging ledge, possible damages to the main body of the component due to the strong hitting of the protruded ledges against the main body can be prevented since the protruded ledge has a protruded height which does not cause pressing of the protruded ledge against an outer periphery of a main body of the component.

According to a seventh aspect of a preferred embodiment of the present invention, in any one of the second to fifth aspects of a preferred embodiment of the present invention, a protruded ledge is radially outwardly extended from one side edge of the silt, and a width between the protruded ledge and the other side edge of the slit is set to be smaller than a width between both side edges of the slit.

With this component connecting structure, at the time of reducing the diameter of the spring body by releasing the engagement between the temporary engaging protrusion and the temporary engaging ledge, the rounded portion formed between the one side edge of the slit and the protruded ledge will function as a guide for introducing the flange portion into the slit, resulting in smooth attaching of the clip to the flange portions. Furthermore, in reducing the diameter of the spring body, since the flange portion will come into contact with the rounded portion of the protruded ledge, possible damages would hardly occur, which in turn can prevent occurrence of corrosion due to scratches or the like.

According to an eighth aspect of a preferred embodiment of the present invention, a component connecting structure comprises a first component having a flange portion, a second component having a flange portion, and a clip for holding both the flange portions in a butted manner so as not to be detached from each other, wherein the clip is formed into a generally polygonal shape by bending a plate spring at plural folding lines and has a spring body having a first circumferential end portion and a second circumferential end portion, the second circumferential end portion being overlapped with the first circumferential end portion by a predetermined length along a circumferential direction in a diameter reduced free state of the clip, wherein the spring body is provided with slits extending in a circumferential direction for inserting the flange portions of both the components butted against each other in the diameter reduced free state, wherein the first circumferential end portion is provided with a temporary engaging protrusion extended from a widthwise side thereof, and the second circumferential end portion is provided with a temporary engaging ledge extended from a widthwise side thereof, and wherein the component connecting structure further comprises a diameter expanded state holding member configured to be pinched by and between the temporary engaging protrusion and the temporary engaging ledge in a diameter expanded state of the spring body and to be detachably attached to the spring body.

With this component connecting structure, the clip can be kept in a diameter expanded state by expanding the diameter of the spring body of the clip against its resilient force and attaching the diameter expanded state holding member to the spring body so as to be positioned between the temporary engaging protrusion of the first circumferential end portion and the temporary engaging ledge of the second circumferential end portion to engage the temporary engaging protrusion with the temporary engaging ledge via the diameter expanded state holding member. With this diameter expanded state, the flange portions of the first and second components are butted against each other, and then the clip is disposed on the outer peripheries of the components with the flange portions aligned with the slits. Then the diameter expanded state holding member pinched by and between the temporary engaging protrusion and the temporary engaging ledge is detached from the spring body. As a result, the engagement between the temporary engaging protrusion and the temporary engaging ledge will be released to cause diameter reduction due to the resilient force of the spring body, resulting in an insertion of the flange portions into the slits. Thus, both the components can be secured with the clip.

As explained above, with this component connecting structure, by temporarily keeping the clip in a diameter expanded state, the engagement between the temporary engaging protrusion and the temporary engaging ledge can be easily released by simply disposing the clip on the outer peripheries of the flange portions butted against each other, positioning the flange portions so as to be aligned with the slits and then detaching the diameter expanded state holding member from the spring body. Thus, both the components can be connected.

The spring body is kept in the diameter expanded state with the diameter expanded state holding member pinched by and between the temporary engaging ledge and the temporary engaging protrusion. Therefore, the temporary engaging ledge and the temporary engaging protrusion are forcibly pressed against both sides of the diameter expanded state holding member by the resilient force of the spring body, resulting assured holding of the diameter expanded state of the spring body. Therefore, even if vibrations and/or external forces are applied to the clip during the transportation of the clip, the clip is hardly detached from both the components and the spring body can be assuredly kept in a diameter expanded state. As a result, the clip can be conveyed in a diameter expanded state in a factory or the like, which can eliminate the user's diameter expanding operation of the clip at the assembling side.

In the diameter decreased state of the spring body, both the circumferential end portions are overlapped with each other. Therefore, even if a radially outward external force is applied to the clip, the clip is hardly detached from both the components. Furthermore, since the first component and the second component each can be a simple structure having a flange portion, the production cost thereof can be reduced.

According to a ninth aspect of a preferred embodiment of the present invention, in the eighth aspect of a preferred embodiment of the present invention, one of the first circumferential end portion and the second circumferential end portion is provided with an engaging hole, and the other of the first circumferential end portion and the second circumferential end portion is provided with an engaging ledge protruded in a direction toward the one of the first circumferential end portion and the second circumferential end portion and in a direction getting away from a tip end portion of the other circumferential end portion, the engaging ledge being configured to be inserted in the engaging hole when the spring body is reduced in diameter.

With this component connecting structure, when the spring body is reduced in diameter, the engaging ledge formed at the other of the first circumferential end portion and the second circumferential end portion will be engaged with the engaging hole formed in the one of the first circumferential end portion and the second circumferential end portion. Therefore, when an external force for expanding the diameter of the spring body is applied to the spring body in the circumferential direction, the engaging ledge will be engaged with the peripheral edge of the engaging hole to keep the spring body in a diameter reduced state.

According to a tenth aspect of a preferred embodiment of the present invention, in the ninth aspect of a preferred embodiment of the present invention, the one of the first circumferential end portion and the second circumferential end portion is disposed on an outer peripheral side of the other of the first circumferential end portion and the second circumferential end portion, and the engaging ledge is formed so as to outwardly protrude from an end portion of the one of the first circumferential end portion and the second circumferential end portion in a state in which the spring body is expanded in diameter with the temporary engaging protrusion engaged with the temporary engaging ledge via the diameter expanded state holding member.

With this component connecting structure, when the spring body is reduced in diameter by detaching the diameter expanded state holding member from the spring body from the diameter expanded state of the spring body, the spring body is reduced in diameter while sliding the engaging ledge obliquely outwardly extended from the other circumferential end portions on the other circumferential end portion so that the one of the circumferential end portions moves toward the inside of the other circumferential end portion. This prevents hitting of the other circumferential end portion against the operators finger.

According to an eleventh aspect of a preferred embodiment of the present invention, in the eighth aspect of a preferred embodiment of the present invention, the temporary engaging ledge is provided at each of both widthwise sides of the second circumferential end portion, and a portion of the first circumferential end portion where the temporary engaging ledges are positioned in a diameter reduced state of the spring body is formed to have a width capable of being inserted between the temporary engaging ledges.

With this component connecting structure, since the portion of the first circumferential end portion where the temporary engaging ledge is positioned in a diameter reduced state of the spring body will be positioned between both the temporary engaging ledges, axial displacements of both the circumferential end portions can be prevented, resulting in secure holding of the flange portions of both the components.

At the time of reducing the diameter of the clip by releasing the engagement between the temporary engaging protrusion and the temporary engaging ledge by detaching the diameter expanded state holding member from the temporarily diameter expanded state of the clip, the corresponding portion of the first circumferential end portion will be introduced between the temporary engaging ledges of the second circumferential end portion while being guided by the temporary engaging ledges. Thus, the spring body can be reduced in diameter smoothly without causing axial displacements of both the circumferential end portions of the spring body.

According to a twelfth aspect of a preferred embodiment of the present invention, in the eighth to eleventh aspects of a preferred embodiment of the present invention, a protruded ledge is radially inwardly extended from one side edge of the slit, and the protruded ledge has a protruded height which does not allow passing of the flange portions in a diameter expanded state of the spring body with the temporary engaging protrusion engaged with the temporary engaging ledge via the diameter expanded state holding member and does not cause pressing of the protruded ledge against an outer periphery of a main body of the component in a diameter reduced state of the spring body.

With this component connecting structure, when the clip is mounted on the outer peripheries of the components in a state in which the spring body is expanded in diameter with the temporary engaging protrusion engaged with the temporary engaging ledge via the diameter expanded state holding member, the protruded ledges are engaged with the flange portion. Therefore, the clip can be easily set such that the flange portions are aligned with the slits.

Furthermore, at the time of reducing the diameter of the spring body by releasing the engagement between the temporary engaging protrusion and the temporary engaging ledge by detaching the diameter expanded state holding member, possible damages to the main body of the component due to the strong hitting of the protruded ledges against the main body can be prevented since the protruded ledge has a protruded height which does not cause pressing of the protruded ledge against an outer periphery of a main body of the component.

According to a thirteenth aspect of a preferred embodiment of the present invention, in the eighth to eleventh aspects of a preferred embodiment of the present invention, a protruded ledge is radially outwardly extended from one side edge of the silt, and a width between the protruded ledge and the other side edge of the slit is set to be smaller than a width between both side edges of the slit.

With this component connecting structure, at the time of reducing the diameter of the spring body by releasing the engagement between the temporary engaging protrusion and the temporary engaging ledge by detaching the diameter expanded state holding member, the rounded portion formed between the one side edge of the slit and the protruded ledge will function as a guide for introducing the flange portion into the slit, resulting in smooth attaching of the clip to the flange portions. Furthermore, in reducing the diameter of the spring body, since the flange portion will come into contact with the rounded portion of the protruded ledge, possible damages would hardly occur, which in turn can prevent occurrence of corrosion due to scratches or the like.

According to a fourteenth aspect of a preferred embodiment of the present invention, in the eighth to thirteenth aspects of a preferred embodiment of the present invention, the temporary engaging protrusion is outwardly extended from a widthwise side of the first circumferential end portion, and the temporary engaging ledge is radially inwardly or radially outwardly extended from a widthwise side of the second circumferential end portion toward the first circumferential end portion.

In this component connecting structure, the temporary engaging protrusion is protruded from the widthwise edge of the first circumferential end portion in the widthwise direction thereof. On the other hand, the temporary engaging ledge is radially outwardly extended from the widthwise edge of the second circumferential end portion toward the first circumferential end portion. With this structure, when the diameter expanded state holding member is mounted on the spring body, the opposed portions of the temporary engaging protrusion and the temporary engaging ledge linearly come into contact with both sides of the engaging portion of the diameter expanded state holding member. This hardly causes a rotation moment of the diameter expanded state holding member, which in turn can prevent the diameter expanded state holding member from being twisted. Thus, the detachment of the first and second circumferential end portions can be prevented.

According to a fifteenth aspect of a preferred embodiment of the present invention, in the eighth to fourteenth aspects of a preferred embodiment of the present invention, the diameter expanded state holding member includes a strip-shaped portion extending in a widthwise direction of the spring body, and engaging portions radially inwardly extended from both end portions of the strip-shaped portion and configured to be engaged with the temporary engaging protrusion and the temporary engaging ledge.

With this component connecting structure, the engaging portion radially inwardly extended is formed on the diameter expanded state holding member. This enlarges the engaging range in which the temporary engaging protrusion and the temporary engaging ledge can be engaged with the engaging portion. With this structure, even if the temporary engaging protrusion or the temporary engaging ledge is slightly shifted in the radial direction, the temporary engaging protrusion or the temporary engaging ledge would hardly be disengaged from the engaging portion, resulting in stable holding of the diameter expanded state of the spring body.

According to a sixteenth aspect of a preferred embodiment of the present invention, in the fifteenth aspect of a preferred embodiment of the present invention, the diameter expanded state holding member further includes a releasing portion extended from one of the engaging portions of the diameter expanded state holding member along an axial direction of the spring body, and wherein a tip end of the releasing portion is bent in a radially inward direction of the spring body and then bent back in a radially outward direction of the spring body.

With this component connecting structure, since the releasing portion is extended from one of the engaging portions of the diameter expanded state holding member along the axial direction of the spring body, the diameter expanded state holding member can be easily detached from the spring body by radially outwardly pulling the releasing portion with fingers. Furthermore, the tip end portion of the releasing portion is bend in a radially inward direction of the spring body. Therefore, the bent portion is prevented from coming into contact with the first component or the second component to be secured with the dip, which restrains possible damages of the components According to a seventeenth aspect of a preferred embodiment of the present invention, in the fifteenth or the sixteenth aspect of a preferred embodiment of the present invention, the diameter expanded state holding member further includes a bent portion extended from the other engaging portion of the diameter expanded state holding member along an axial direction of the spring body and then bent in a radially outward direction of the spring body.

With this component connecting structure, a bent portion extended from the other engaging portion of the diameter expanded state holding member in the axial direction of the spring body and then bent in a radially outward direction of the spring body is provided. Therefore, the tip edge portion of the engaging portion is prevented form coming into direct contact with the first component or the second component to be secured by the clip. As a result, possible damages of each component can be restrained.

EFFECTS OF THE INVENTION

With this component connecting structure according to the present invention, both the components can be connected by simply engaging the temporary engaging ledge with the temporary engaging protrusion to temporarily keep the clip in a diameter expanded state, then releasing the engagement between the temporary engaging protrusion and the temporary engaging ledge after mounting the clip on the outer peripheries of the components with the flange portions of the first component and the second component butted against each other and with the slits aligned with the flange portions.

In the diameter decreased state of the spring body, both the circumferential end portions are overlapped with each other. Therefore, even if a radially outward external force is applied to the clip, the clip is hardly detached from both the components. Furthermore, since the first component and the second component each can be a simple structure having a flange portion, the production cost thereof can be reduced.

On the other hand, with the component connecting structure according to another invention, by simply engaging the temporary engaging ledge with the temporary engaging protrusion to temporarily via the diameter expanded state holding member keep the clip in a diameter expanded state, and then detaching the diameter expanded state holding member from the spring body after mounting the clip on the outer peripheries of the components with the flange portions of the first component and the second component butted against each other and with the slits aligned with the flange portions, the engagement between the temporary engaging protrusion and the temporary engaging ledge can be released. Thus, both the components can be secured.

Furthermore, since the diameter expanded state holding member is pinched by and between the temporary engaging ledge and the temporary engaging protrusion, the temporary engaging ledge and the temporary engaging protrusion are forcibly pressed against both sides of the diameter expanded state holding member. Therefore, the spring body can be assuredly kept in the diameter expanded state. As a result, even if vibrations and/or external forces are applied to the clip during the transportation thereof, the diameter expanded state of the clip can be maintained. Therefore, in a factory or the like, the clip can be transported in a diameter expanded state. This eliminates the diameter expansion operation of the clip by a user at an assembling site.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

First Embodiment

A component connecting structure according to a first embodiment of the present invention will be explained with reference to FIGS. 1 to 10.

Figure 1:
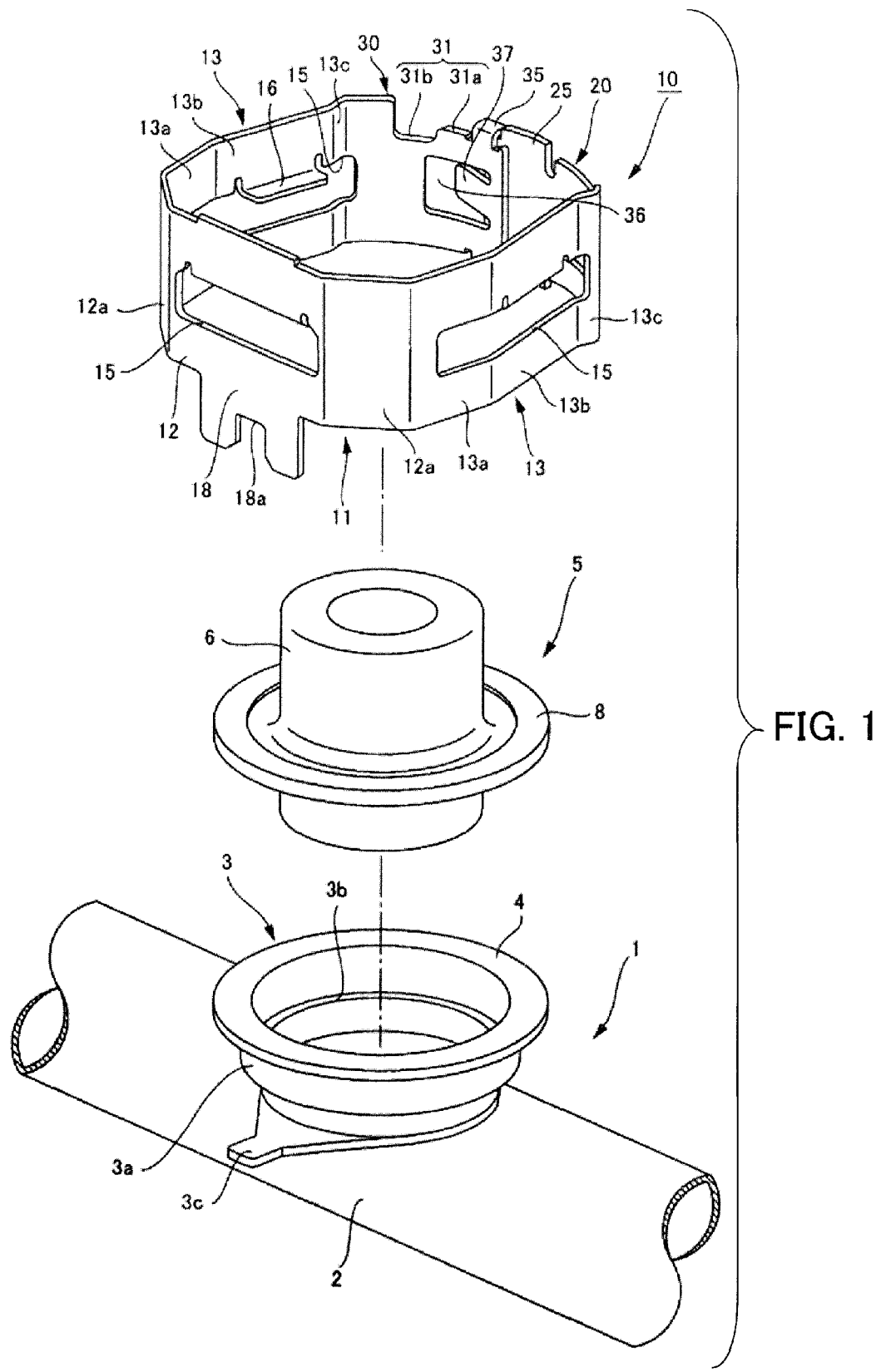
FIG. 1 is an exploded perspective view showing a first embodiment of a component connecting structure according to the present invention.

As shown in FIG. 1, this component connecting structure is comprised of a first component 1 having a flange portion 4, a second component 5 having a flange portion 8, and a clip 10 configured to hold both the flange portions 4 and 8 in a butted state so as not to be detached from each other.

The first component 1 of this embodiment is a fuel pipe attached to an intake manifold (not illustrated) to supply a fuel to each cylinder of an automobile internal-combustion engine. As shown in FIG. 1, this first component 1 has a pipe main body 2 and a socket 3 communicated with the pipe main body 2 and secured to a predetermined portion of the external periphery of the pipe main body 2. The socket 3 is configured to receive and hold the lower portion of the main body 6 of the second component 5. The peripheral wall 3a of the socket 3 is formed by a cylindrical wall having an inner periphery enlarged in diameter in a stepwise fashion toward the upper opening and has an annular flange portion 4 radially outwardly extended from the upper end periphery of the cylindrical wall. The stepped portion 3b formed at the upper inner peripheral portion of the peripheral wall 3a is configured to support a sealing ring (not illustrated) so that the sealing property between the inner periphery of the socket 3 and the external periphery of the main body 6 of the second component 5 to be inserted in the socket 3 can be enhanced. At the lower end external portion of the peripheral wall 3a, an antirotation ledge 3c for preventing the rotational movement of the clip 10 with respect to the first component 1 by being engaged with the dented portion 18a of an antirotation member 18 of the clip 10.

In this embodiment, the second component 5 to be connected to the first component 1 using the clip 10 is a pulsation dumper for attenuating the fuel pressure pulsation (jiggly fuel pressure changes) caused in accordance with the fuel injection from an injection valve to reduce noise. This second component 5 is comprised of a cylindrical main body 6 and a flange portion 8 annularly extended from the external periphery of the axially intermediate portion of the main body 6. This flange portion 8 of this second component 5 is configured to butt against the flange portion 4 formed at the upper end of the socket 3 when the lower portion of the main body 6 is inserted in the socket 3 of the first component 1. At the lower end portion of the main body 6, an inlet opening (not illustrated) is formed to introduce fuel vapor from the first component 1. In the main body 6 of the second component 5, a diaphragm (not illustrated) is mounted so that the aforementioned pulsation pressure can be absorbed by being deformed in accordance with the fuel pressure. In cases where the first component 1 is a fuel pipe, a pressure regulator or the like for keeping the fuel pressure constant as the second component 5 can be attached to the first component 1.

In this first embodiment, a fuel dumper is employed as the first component 1, and a pulsation dumper is employed as the second component 5. It should be understood, however, that the first and second components 1 and 5 are not specifically limited so long as they have flange portions. For example, the first and second components 1 and 5 can be a pair of tubular members each having a flange portion at one end thereof.

Hereinafter, the clip 10 for connecting the first component 1 and the second component 5 will be explained with reference to FIGS. 1 to 10. This clip 10 is comprised of a spring body 11 formed by bending an elongated rectangular plate spring at plural bend lines into a polygonal shape as seen from the top. In the diameter reduced free state, the first circumferential end portion 20 of the clip 10 and the second circumferential end portion 30 thereof are overlapped along the predetermined circumferential length to form an annular shape as a whole. The clip 10 has temporary engaging protrusions 25 at the first circumferential end portion 20 and temporary engaging ledges 35 at the second circumferential end portion 30. In this free state, the spring body 11 takes a diameter reduced posture in which the second circumference end portion 30 is overlapped with the first circumference end portion 20 along a long circumferential length (see FIGS. 3 and 4). When the first circumferential end portion 20 and the second circumferential end portion 30 are pulled away from each other to reduce the overlapped length, the spring body 11 takes a diameter expanded posture (see FIGS. 1, 2 and 7). In the diameter expanded posture, by engaging the temporary engaging ledges 35 with the temporary engaging protrusions 25, the diameter expanded posture can be maintained.

In this embodiment, the spring body 11 is comprised of a base plate portion 12 linearly extending at an approximately longitudinal intermediate portion of an elongated rectangular shaped plate spring, oblique side portions 12a and 12a obliquely extended from ends of the base plate portion 12, a pair of right and left side plate portions 13 and 13 inwardly extended from the oblique side portions 12a and 12a, and a first circumferential end portion 20 and a second circumferential end portion 30 extended from the side plate portions 13 and 13 in a circular manner and overlapped with each other for a predetermined circumferential length in a fee state. Each of the aforementioned side plate portions 13 has a basal end portion 13a extended from the oblique side portion 12a at an approximately right angle with respect to the base plate portion 12, an intermediate portion 13b inwardly extended from the basal end portion 13a, and a tip end portion 13c extended from the tip end of the intermediate portion 13b in a slightly outwardly bent manner at a right angle with respect to the base plate portion 12. The first circumferential end portion 20 and the second circumferential end portion 30 each formed in a circular shape are extended from the tip end portions 13c and 13c in an inwardly bent manner so that both the end portions 20 and 30 are overlapped with each other in a free state. In this embodiment, the first circumferential end portion 20 and the second circumferential end portion 30 are overlapped with each other with the former positioned at the outside of the latter.

Figure 2:
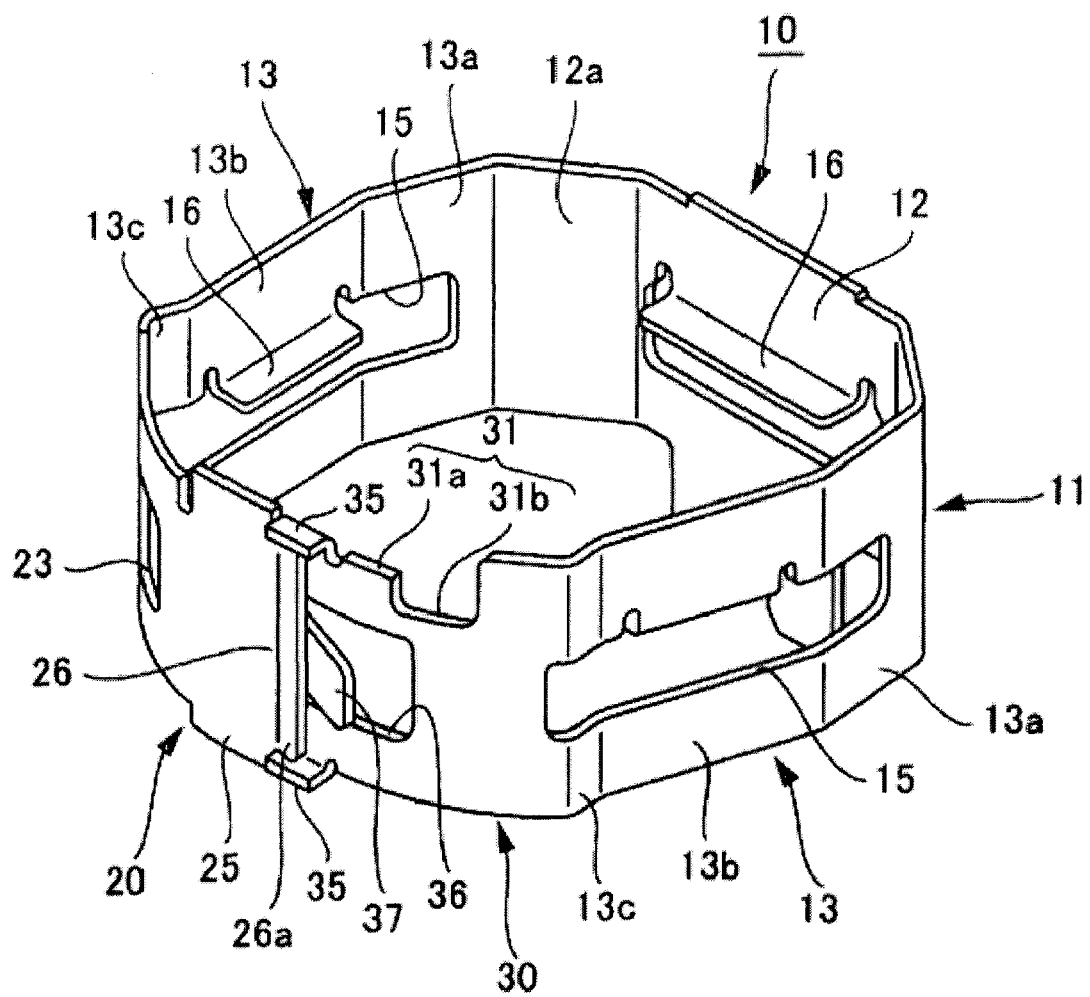
FIG. 2 is a perspective view showing a clip constituting the component connecting structure in a diameter expanded state.
Figure 3:
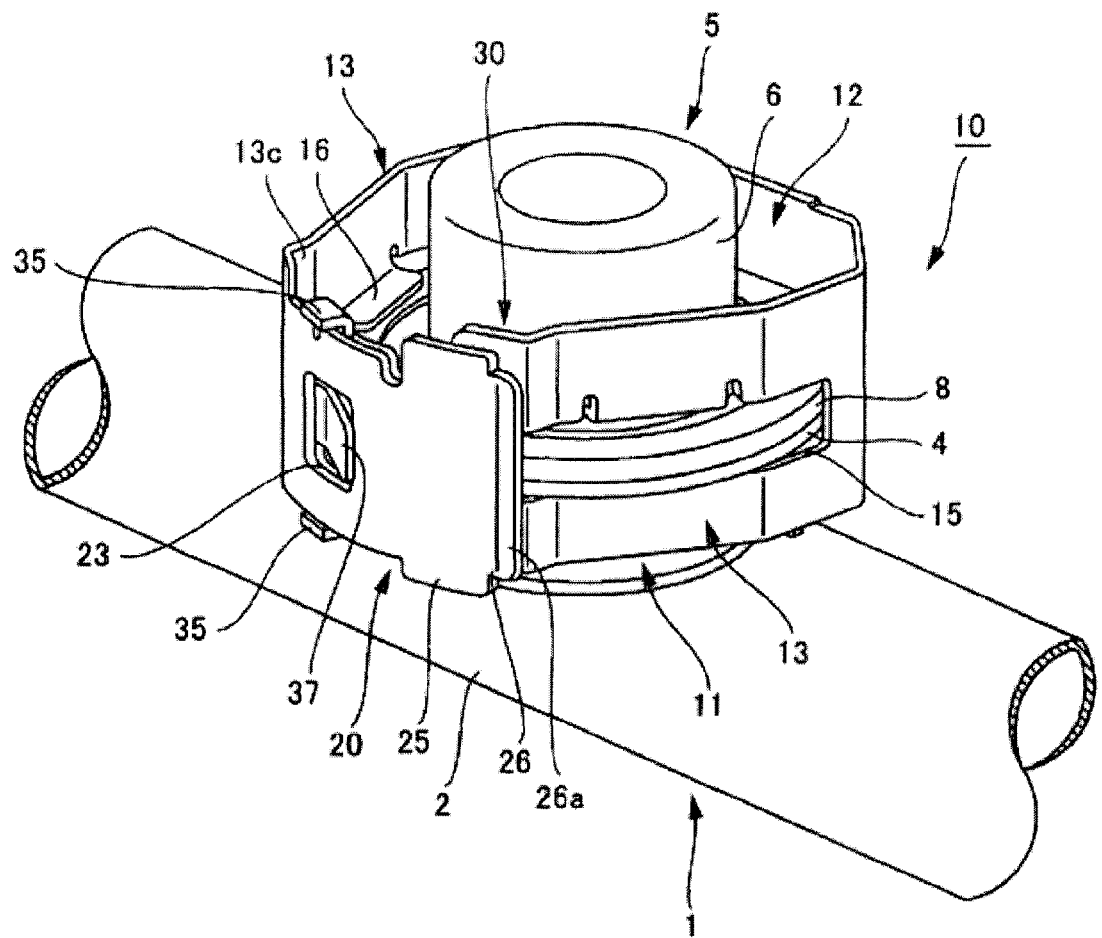
FIG. 3 is a perspective view showing a state in which components are connected by the component connecting structure.

As shown in FIG. 3, the spring body 11 is provided with circumferentially extended slits 15 for fitting the flange portions 4 and 8 of the components 1 and 5 in a butted manner. Referring to FIGS. 1 and 2, a circumferentially extended slit 15 is formed in the widthwise intermediate portion of the base plate portion 12 other than both the oblique side portions 12a and 12a, and circumferentially extended slits 15 and 15 are also formed in the widthwise intermediate portions of the pair of right and left side plate portions 13 and 13.

Each of the aforementioned slits 15 of the spring body 11 has a bent protruded ledge 16. Concretely, one protruded ledge 16 is extended from one side edge of the slit 15 formed in the central portion of the base plate portion 12 in a radially inwardly bent manner. Similarly, protruded ledges 16 and 16 are extended from respective side edges of slits 15 formed in the intermediate portions 13b of the right and left side plate portions 13 in a radially inwardly bent manner. Each protruded ledge 16 is formed to have a projection height so that the flange portion 8 of the second component 5 is engaged with the protruded ledge 16 and held by the flange portion 8 in a state in which the spring body 11 is expanded in diameter and the temporary engaging protrusion 25 is engaged with the temporary engaging ledge 35 (see FIG. 7). Furthermore, the projection height of the protruded ledge 16 is set so that the flange portion 8 does not come into strong contact with the external periphery of the main body 6 of the second component 5 in a state in which the spring body 11 is reduced in diameter (see FIGS. 3 and 10). By setting the projection height of each protruded ledge 16 to the former height, the protruded ledge 16 can be engaged with the flange portion 8 of the second component 5 in a state in which the spring body 11 is expanded in diameter. By setting the projection height of each protruded ledge 16 to the latter height, it becomes possible to cause the possible damage of the main body 6 of the second component 5 by the strong contact of the protruded ledge 16 against the external periphery of the main body 6 of the second component 5 in a state in which the spring body 11 is reduced in diameter.

As shown in FIG. 1, from the widthwise side edge of the base plate portion 12 of the spring body 11, an antirotation member 18 having a predetermined height is extended in the axial direction. At the lower end portion of the antirotation member 18, a dented portion 18a having a predetermined depth and configured to fit the antirotation ledge 3c of the first component 1 is formed, so that the rotation of the clip 10 with respect to the first component 1 is prevented.

Figure 6:
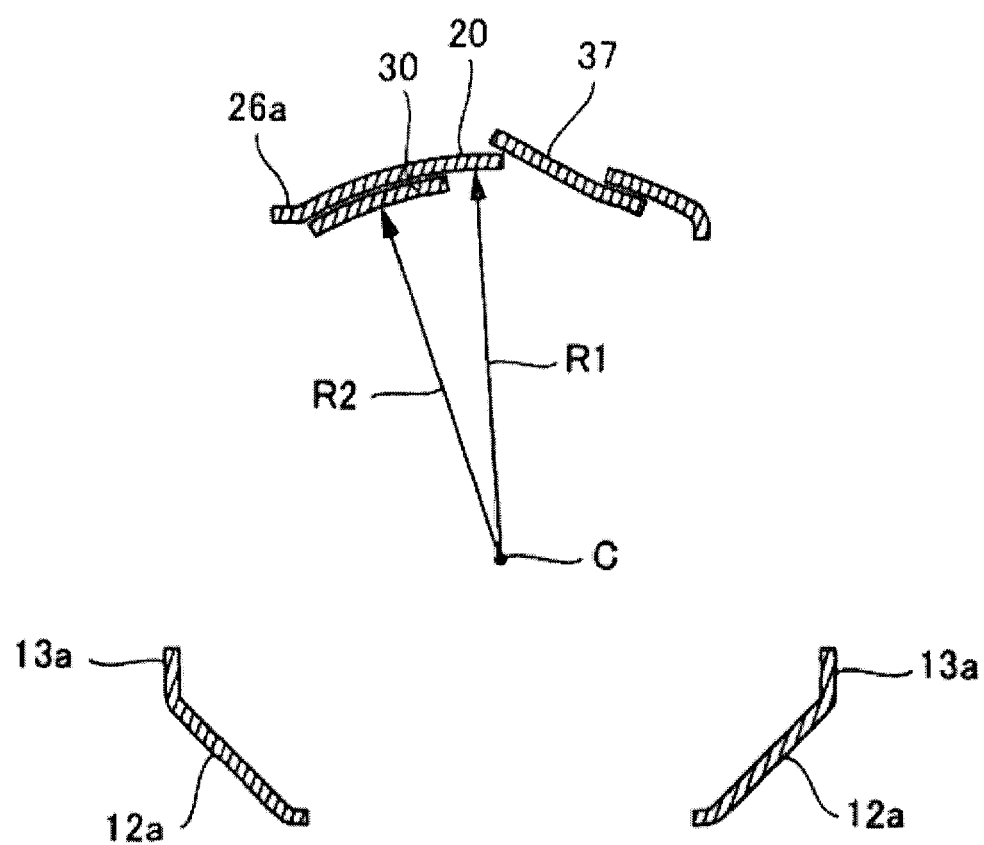
FIG. 6 is a cross-sectional view taken along the line A-A in FIG. 5.

Now, the first circumferential end portion 20 and the second circumferential end portion 30 provided at both ends of the spring body 11 will be explained. As explained above, the second circumferential end portion 30 and the first circumferential end portion 20 overlapped with the external periphery of the second circumferential portion 30 are formed into a circular shape. Concretely, as shown in FIG. 6, with respect to the axial center C of the clip 10, the second circumferential end portion 30 is formed to have a circular shape with a radius R2, and the first circumferential end portion 20 is formed to have a circular shape with a radius R1 larger than the radius R2 of the second circumferential end portion 30 by the thickness thereof. Thus, the external periphery of the second circumferential end portion 30 is in an approximately close contact with the inner periphery of the first circumferential end portion 30. With this structure, by releasing the engagement between the temporal engaging protrusions 25 and the temporal engaging ledges 35 from the diameter expanded state of the clip 10, the first circumferential end portion 20 can be smoothly slipped on the outer periphery of the second circumferential end portion 30 to be resiliently returned and that both the circumferential end portions can be overlapped with no gap therebetween.

Figure 5:
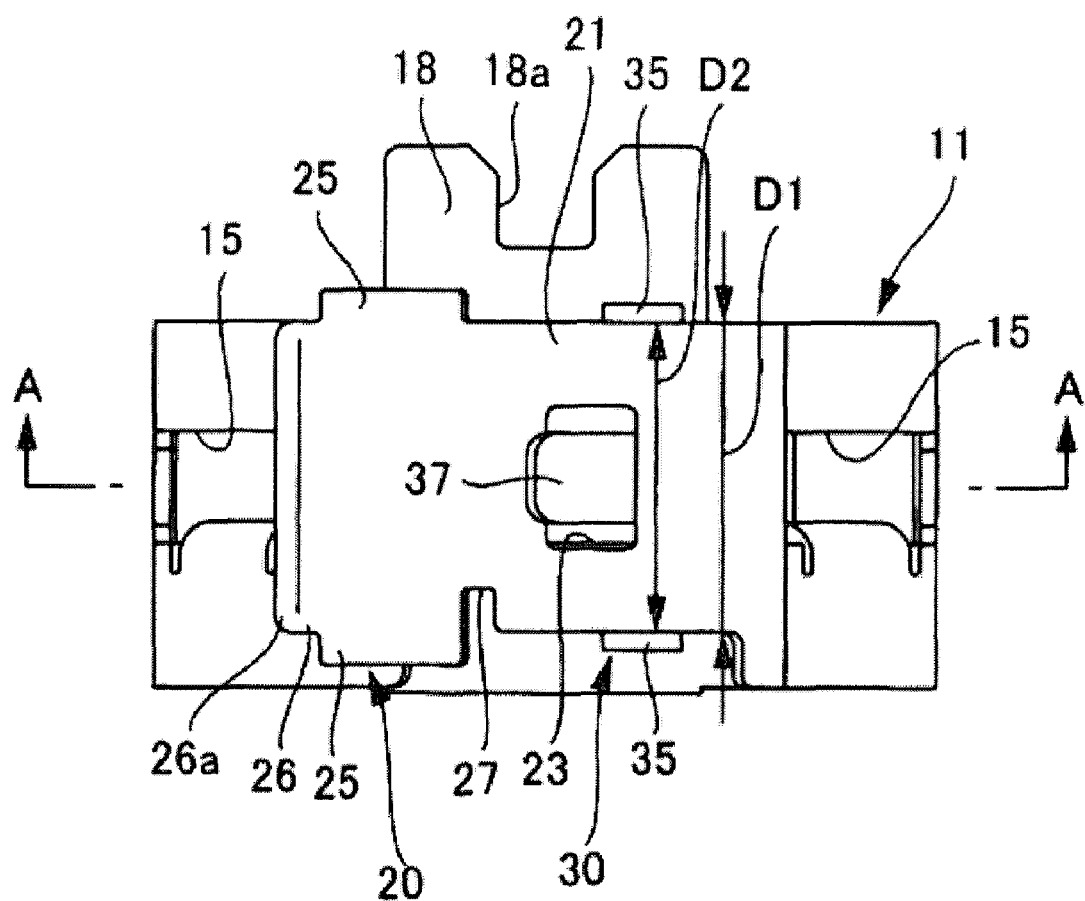
FIG. 5 is a front view showing the clip constituting the component connecting structure in a diameter reduced state.

As shown in FIG. 5, the first circumferential end portion 20 extending in the peripheral direction in a circular manner has a narrow width portion 21 having a width D1 smaller than the width of the side plate portion 13 formed by circumferentially cutting one widthwise side for a predetermined length. The width D1 of this narrow width portion 21 is approximately equal to or slightly smaller than the distance D2 between temporary engaging protrusions 35 outwardly extending from the both sides of the second circumferential end portion 30, so that, in a state in which the spring body 11 is reduced in diameter as shown in FIG. 5, the narrow width portion 21 is placed between the temporary engaging protrusions 35 and 35 of the second circumferential end portion 30. The narrow width portion 21 is provided, at its intermediate portion, with a generally rectangular engaging hole 23 into which an engaging ledge 37 of the second circumferential end portion 30 is inserted when the spring body 11 is reduced in diameter.

As shown in FIG. 5, in the widthwise side edge of the tip end portion of the narrow width portion 21, a cut-out portion 27 is formed so as to extend the width direction of the spring body 11. The first circumferential end portion 20 has, at its tip end side portion located at a tip end side than the narrow width portion 21, via the cut-out portion 27, a pair of temporary engaging protrusions 25 and 25 each having a predetermined height extending in the width directions from both the widthwise sides of the tip end side portion. These temporary engaging protrusions 25 and 25 will be engaged with the temporary engaging ledges 35 and 35 of the second circumferential end portion 30 to keep the diameter expanded state of the spring body 11.

The tip end portion 26 of the first circumferential end portion 20 is formed to have a stepped portion having a width narrower than that of the temporary engaging protrusion 25. The width of the tip end portion 26 is set to the same width D1 as that of the narrow width portion 21. The tip end of the tip end portion 26 is radially outwardly bent at a predetermined angle into a bent ledge 26a. As shown in FIG. 2, when the spring body 11 is expanded in diameter with the temporary engaging protrusions 25 and 25 engaged with the temporary engaging ledges 35 and 35, the tip end portion 26 will be positioned between the temporary engaging ledges 35 and 35 to hold the engagement between the temporary engaging protrusions 25 and 25 and the temporary engaging ledges. The outwardly obliquely bent ledge 26a functions to enhance the slidable movement of the first circumferential end portion 20 on the outer side of the second circumferential end portion 30 when the spring body 11 is reduced in diameter from the diameter expanded state and to allow the outward protrusion of the outwardly obliquely protruded engaging ledge 37, which will be detailed later.

Next, the second circumferential end portion 30 will be explained. As shown in FIGS. 1 and 2, the second circumferential end portion 30 has, at its one widthwise side, a dented portion 31 having a narrow width. The dented portion 31 is comprised of a relatively shallow portion 31a and a relatively deep portion 31b. The width of the shallow portion 31a is set to approximately the same width as the width D1 of the aforementioned narrow width portion 21. At the both sides of the shallow portion 31a, a pair of temporary engaging ledges 35 and 35 radially outwardly bent toward the first circumferential end portion 20 are formed. This pair of temporary engaging ledges 35 and 35 is configured to be engaged with the temporary engaging protrusions 25 and 25 to thereby keep the diameter expanded state of the spring body 11.

In the second circumferential end portion 30, a generally U-shaped slit 36 is formed along the circumferential direction. With this slit 36, an engaging ledge 37 extending in a direction toward the first circumferential end portion 20 and in a direction departing from the tip end portion of the second circumferential end portion 30 is formed. In this embodiment, the engaging ledge 37 is formed via the generally U-shaped slit 36 so as to extend radially outwardly and obliquely. This engaging ledge 37 will be entered into the engaging hole 23 of the first circumferential end portion 20 when the spring body 11 is reduced in diameter (see FIGS. 3 and 5) to prevent the opening of the spring body 11.

Next, the steps of connecting the first component 1 and the second component 1 by the aforementioned component connecting structure of the present invention and the functions will be explained.

Figure 4:
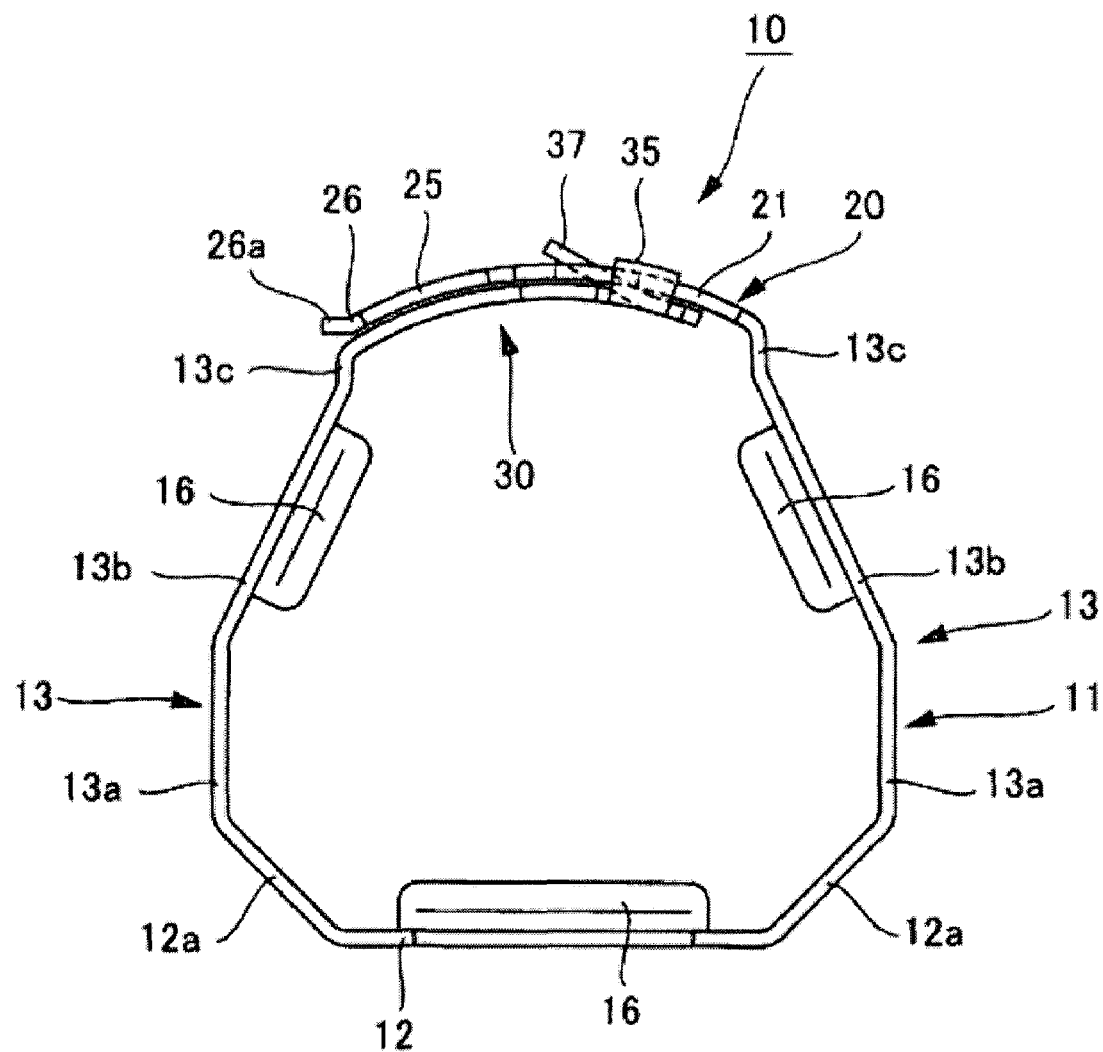
FIG. 4 is a top view showing the clip constituting the component connecting structure in a diameter reduced state.

FIGS. 3 to 5 show the spring body 11 in a diameter reduced free state in which the engaging ledge 37 of the second circumferential end portion 30 is inserted in the engaging hole 23 of the first circumferential end portion 20 and the first and second circumferential end portions 20 and 30 are overlapped approximately along the entire periphery thereof except for the basal end portion of the first circumferential end portion 20.

From this diameter reduced state, the pair of side plate portions 13 and 13 are slightly pressed so that both the side plate portions approach to release the engagement of the tip end portion of the engaging ledge 37 with one side edge of the engaging hole 23 (see FIG. 5), and then the first circumferential end portion 20 is lifted up with respect to the second circumferential end portion 30 to pull out the engaging ledge 37 from the engaging hole 23. From this state, while keeping the adjacently disposed state of the tip end portions of the first and second circumferential end portions 20 and 30, the spring body 11 is increased in diameter against its resilient force to cause the engagement between the tip side edges of the temporary engaging ledges 35 and 35 and the tip side edges of the tip end portion 26 of the temporary engaging protrusions 25 and 25. As a result, as shown in FIGS. 1 and 2, the spring body 11 can be temporarily kept in a diameter expanded state. At this time, the engaging ledge 37 of the second circumferential end portion 30 is protruded outwardly obliquely from the inner peripheral side of the bent ledge 26a of the first circumferential end portion 20 toward the outer peripheral side of the first circumferential end portion 20 by a predetermined length (see FIGS. 2 and 7).

Figure 7:
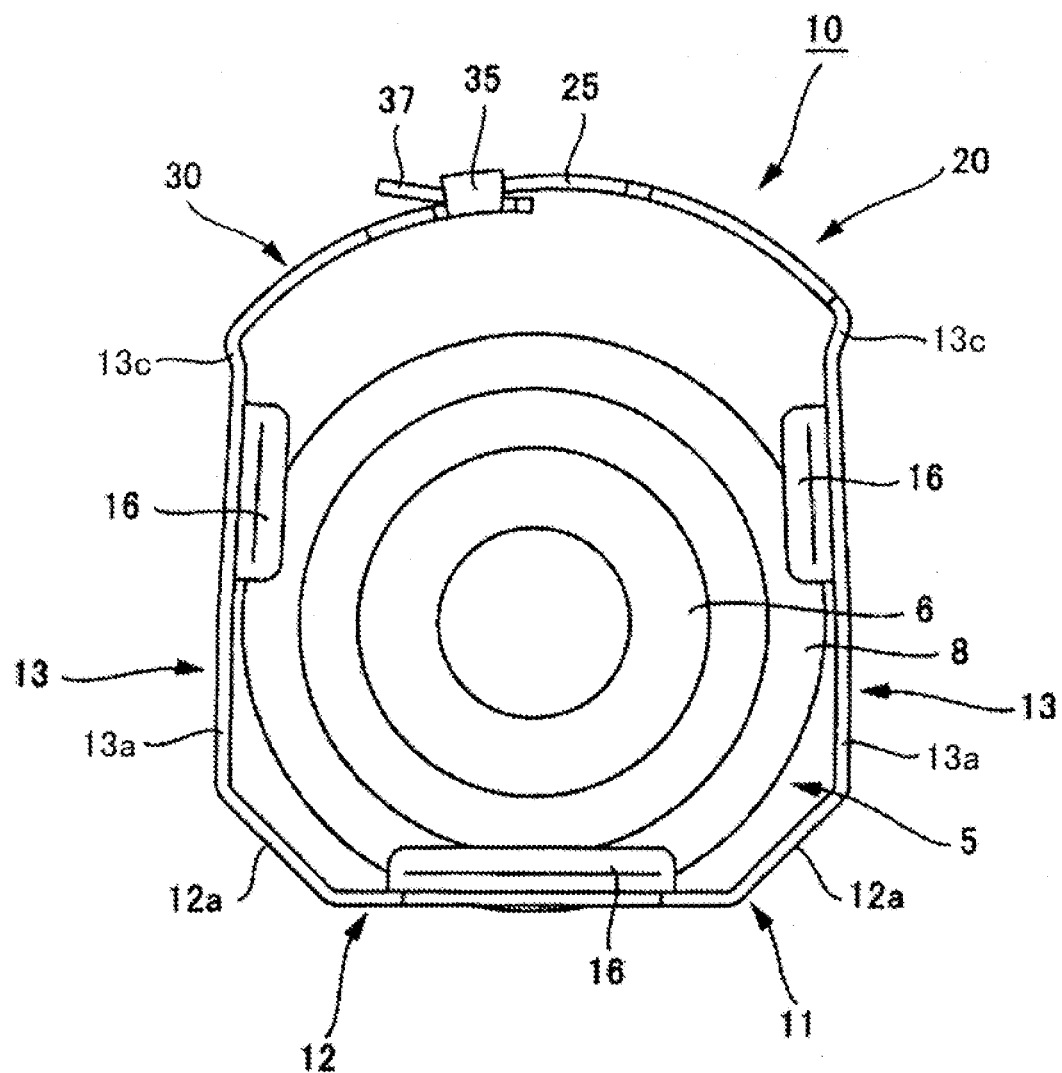
FIG. 7 is a top view showing the clip constituting the component connecting structure in a diameter expanded state.

In this state, as shown in FIG. 1, the main body 6 of the second component 5 is inserted into the socket 3 of the first component 1 and then the flange portions 4 and 8 of the first and second components 1 and 5 are butted against with each other. With this butted state, the clip 10 temporarily expanded in diameter is mounted on the outer peripheries of the first and second components 1 and 5 from the above with the flanges 4 and 8 aligned with the slits 15 of the clip 10. This state is shown in FIG. 7. Since each protruded ledge 16 is set to have a projection height which does not allow passing of the flange portion 8 with the spring body 11 temporarily kept in a diameter expanded state, each protruded ledge 16 is engaged with the flange portion 8 of the second component 5. As a result, both the flange portions 4 and 8 can be easily set in such a manner that the flange portions 4 and 8 are aligned with each slit 15. At this time, the antirotation ledge 3c of the first component 1 is fitted in the dented portion 18a of the antirotation member 18 of the clip 10.

From this temporary mounting state, the engagements between the temporary engaging protrusions 25 and 25 and the temporary engaging ledges 35 and 35 are released. As shown in FIGS. 2 and 7, in this state, the engaging ledge 37 of the second circumferential end portion 30 is outwardly obliquely extending from the bent ledge 26a of the first circumferential end portion 20, so that the engaging ledge 37 is outwardly protruded by a predetermined length. This enhances the releasing operation since the engagement between the temporary engaging protrusions 25 and 25 and the temporary engaging ledges 35 and 35 can be easily released by simply pressing the engaging ledge 37 from the side of the first circumferential end portion 20 with a finger.

Figure 8:
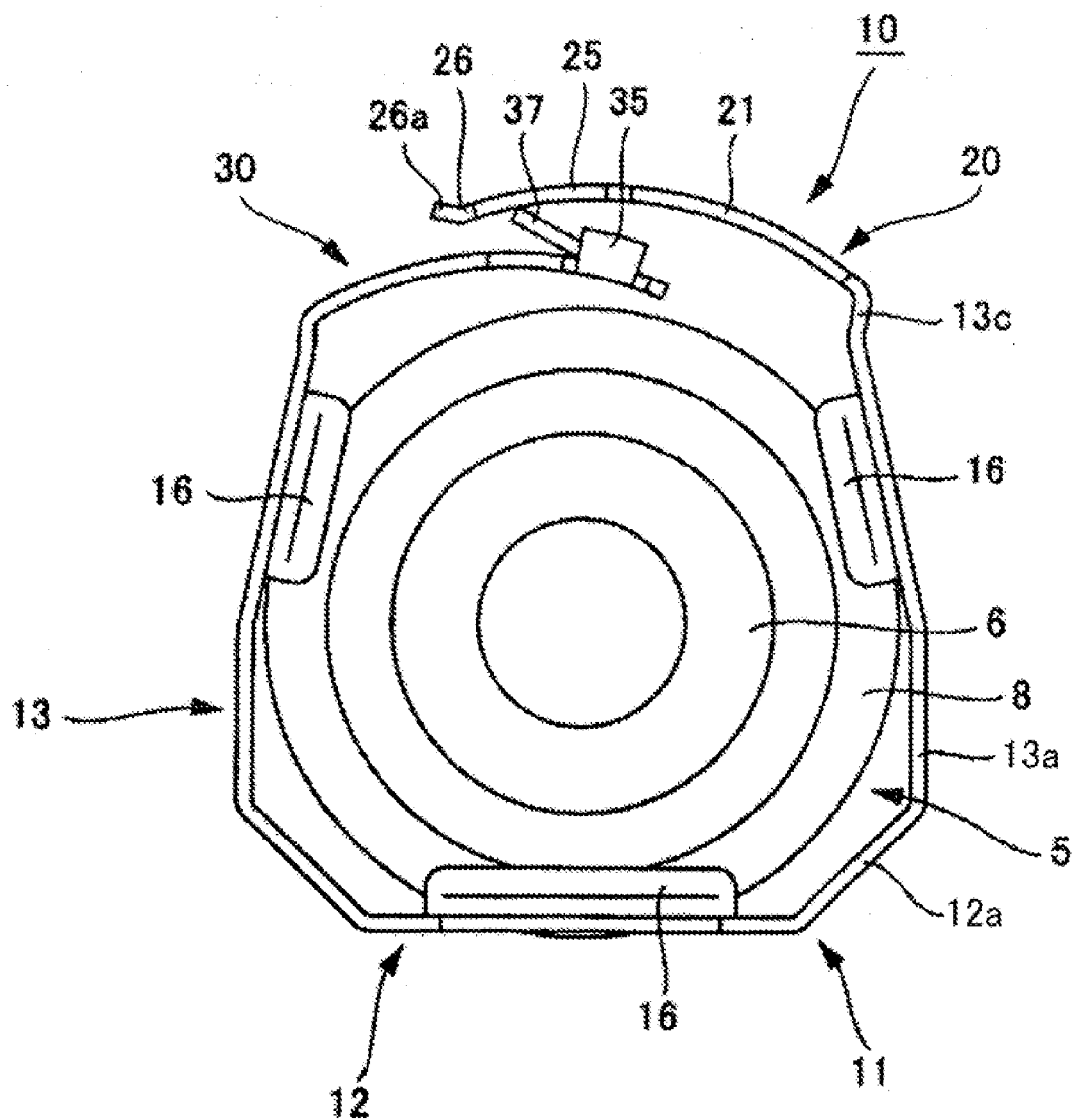
FIG. 8 is a top view showing the clip at the early stage of reducing the diameter.
Figure 9:
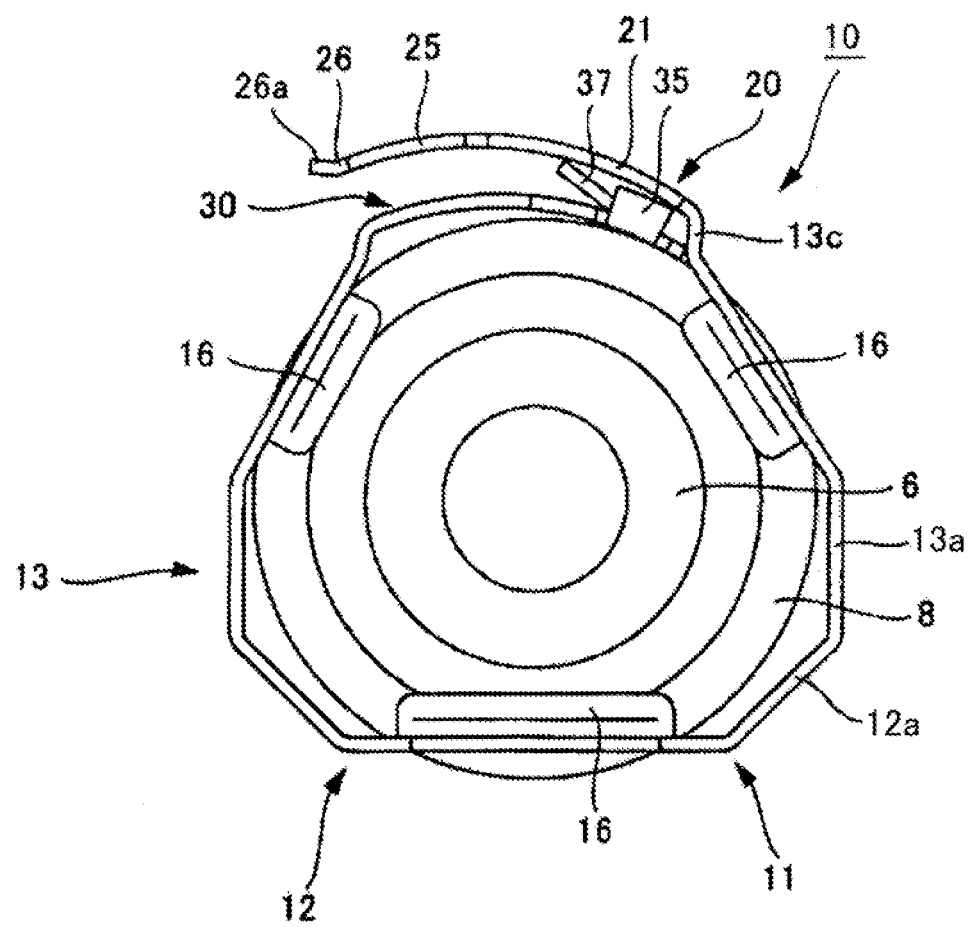
FIG. 9 is a top view showing the clip in which the diameter is further reduced.
Figure 10:
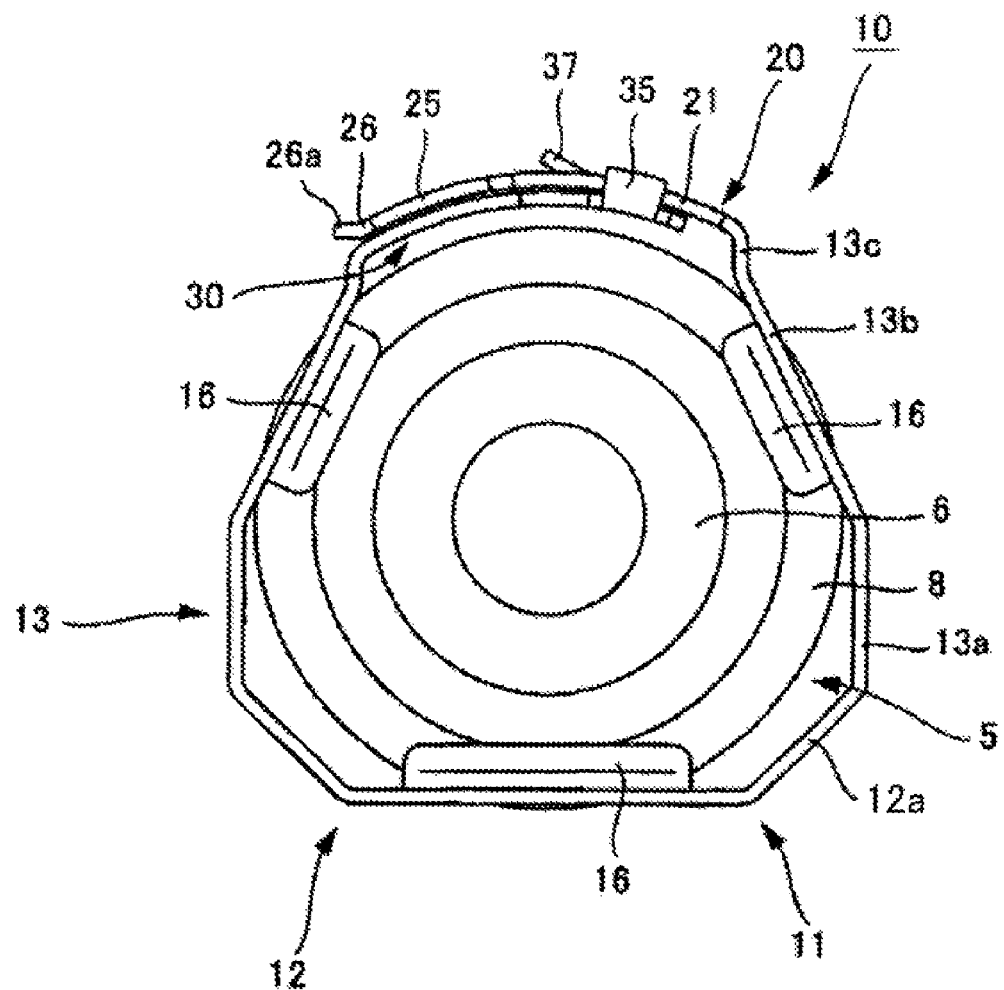
FIG. 10 is a top view showing the clip in which the diameter is completely reduced to connect both components.

When the engagements between the temporary engaging protrusions 25 and 25 and the temporary engaging ledges 35 and 35 are released, the spring body 11 will be reduced in diameter by its own spring force (resilience). This diameter decreasing operation of the circumferential end portions 20 and 30 will be explained. When the engagements between the temporary engaging protrusions 25 and 25 and the temporary engaging ledges 35 and 35 are released from the diameter expanded state of the spring body 11 shown in FIG. 7, the spring body 11 will be reduced in diameter with the engaging ledge 37 of the second circumferential end portion 30 in contact with the inner periphery of the first circumferential end portion 20 as shown in FIG. 8 so that the second circumferential portion 30 moves toward the inside of the first circumferential end portion 20. Furthermore, the second circumferential end portion 30 will continue to move toward the basal end portion side of the first circumferential end portion 20. As a result, as shown in FIG. 9, the tip end portion of the second circumferential end portion 30 will hit against the radially outwardly bent tip end portion 13c of the side plate portion 13 and bounced back to cause an insertion of the engaging ledge 37 in the engaging hole 23. At the same time, the flange portions 4 and 8 of both the components 1 and 5 will be inserted in each slit 15 of the spring body 11 (see FIGS. 3 and 10). Thus, both the components 1 and 5 are fixed with the clip 10.

As mentioned above, when the spring body 11 is being reduced in diameter, the second circumferential end portion 30 slides on the inner periphery so that the second circumferential portion 30 moves toward the inside of the first circumferential end portion 20. This prevents hitting of the second circumferential end portion 30 against the operator's finger. Furthermore, as shown in FIG. 9, it is constituted that, when the spring body 11 is reduced in diameter, the tip end portion of the second circumferential end portion 30 hits against the radially outwardly bent tip end portion 13c of the side plate portion 13. This prevents strong hitting of the second circumferential end portion 30 against the second component 5, which in turn can prevent the possible damages of the second component 5.

Furthermore, the narrow width portion 21 of the first circumferential end portion 20 is formed to have a width D1 so that the narrow width portion 21 can be disposed between the temporary engaging ledges 35 and 35 of the second circumferential end portion 30. Accordingly, the temporary engaging ledges 35 and 35 can function as guides of the narrow width portion 21 when the engagements between the temporary engaging protrusions 25 and 25 and the temporary engaging ledges 35 and 35 are released to decrease the diameter of the spring body 11 from the temporary diameter expanded state of the spring body 11. Furthermore, the narrow width portion 21 of the first circumference end portion 20 will be disposed between the temporary engaging ledges 35 and 35 of the second circumferential end portion 30 with the spring body 11 decreased in diameter. Accordingly, this prevents axial displacements of both the circumferential end portions 20 and 30, which in turn can assuredly hold the flange portions 4 and 8 of the components 1 and 5.

As explained above, according to the present invention, both the components 1 and 5 can be connected by simply setting the temporary diameter expanded clip 10 around the outer peripheries of the butted flange portions 4 and 8 of the components 1 and 5 to be connected and then releasing the engagement between the temporary engaging protrusions 25 and 25 and the temporary engaging ledges 35 and 35 with the flange portions 4 and 8 aligned with the slits 15 and 15.

Furthermore, in the diameter reduced state of the spring body 11, since both the circumferential end portions 20 and 30 are overlapped, even if an external force is applied to the clip 10 in the radial direction, the clip 10 would hardly be detached from the components 1 and 5. In addition, the first component 1 and the second component 5 each can be a simple structure having a flange portion 4 and 8, resulting in a reduced production cost.

As shown in FIGS. 3 and 5, this embodiment is configured such that the engaging ledge 37 of the second circumferential end portion 30 will be inserted in and engaged with the engaging hole 23 formed in the first circumferential end portion 20 when the spring body 11 is reduced in diameter. When a diameter expanding external force in the peripheral direction of the spring body 11 is applied to the spring body 11, the engaging ledge 37 will be engaged with the periphery of the engaging hole 23 to prevent the opening of the spring body 11, which in turn can assuredly hold the diameter reduced state of the spring body 11.

Second Embodiment

Figure 11:
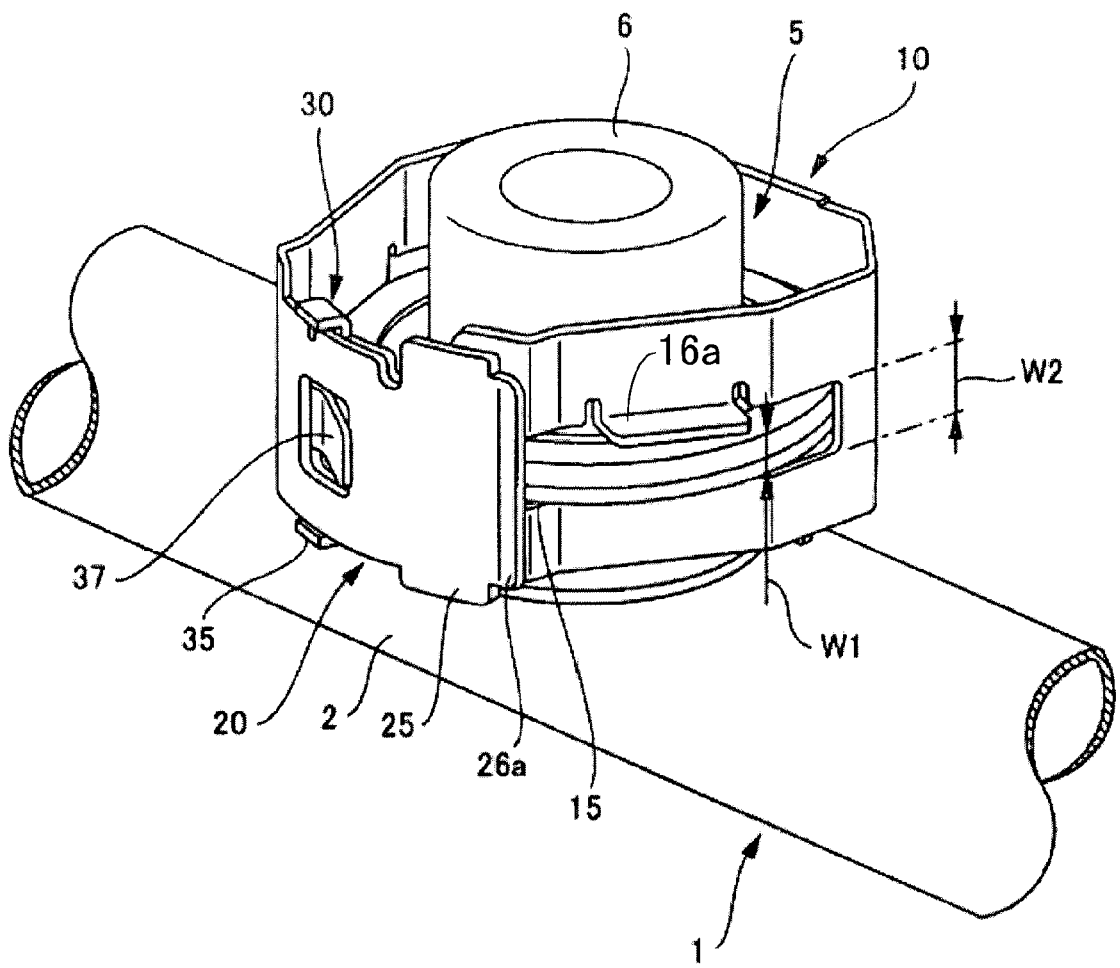
FIG. 11 is a perspective view showing a second embodiment of a component connecting structure according to the present invention.

FIG. 11 shows a second embodiment of a component connecting structure according to the present invention. The same reference numerals as those of the first embodiment will be allotted to substantially the same portions as those of the first embodiment to avoid the cumulative explanation.

This embodiment is different from the first embodiment in the protruded ledge extended from the edge of each slit 15 of the clip 10. In detail, in the first embodiment, the protruded ledge 16 is radially inwardly extended from one side edge of each slit 15. To the contrary, in this second embodiment, the protruded ledge 16a is radially outwardly extended from one side edge of each slit 15. Furthermore, in this embodiment, the width W1 (distance) between this protruded ledge 16a and the other side edge of the slit 15 is set to be smaller than the width W2 (distance) between both side edges of the slit 15.

With this embodiment, when the spring body 11 is reduced in diameter by releasing the engagement between the temporary engaging protrusions 25 and 25 and the temporary engaging ledges 35 and 35, the bent rounded portion formed between the one side edge of the slit 15 and the protruded ledge 16a functions as a guide for introducing the flange portion 8 of the second component 5 into the slit 15, which facilitates the engagements of the flange portions 8 with the slits 15 and 15. Furthermore, at the time of reducing the diameter of the spring body 11, the flange portion 8 comes into contact with the bent rounded portion of the protruded ledge 16a, causing less scratches or damages on the flange portion 8, which in turn can prevent occurrence of corrosion due to scratches or damages. The protruded ledge 16a can be formed at both of the upper and lower side edges of the slit 15.

Third Embodiment

Figure 12:
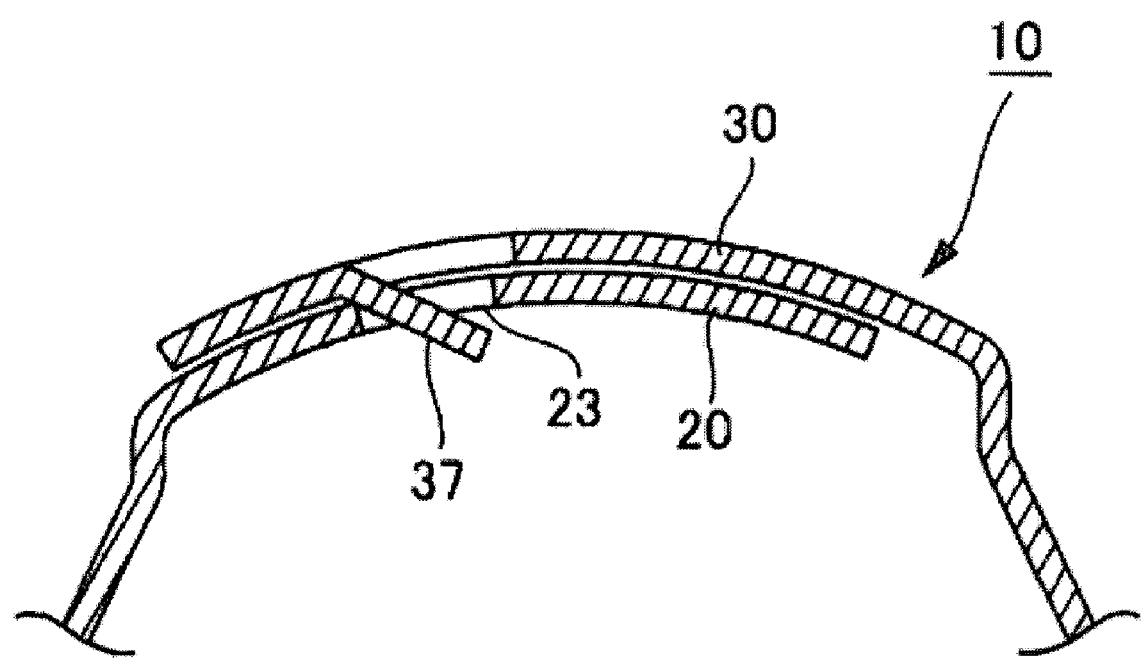
FIG. 12 is a partially enlarged cross-sectional view showing a principal portion of a component connecting structure according to a third embodiment of the present invention.

FIG. 12 shows an enlarged cross-section of a principal portion of a component connecting structure according to a third embodiment of the present invention. The same reference numerals as those of the first embodiment will be allotted to substantially the same portions as those of the first embodiment to avoid the cumulative explanation.

In this embodiment, the second circumferential end portion 30 is arranged on the outer surface of the first circumferential end portion 20, and the engaging ledge 37 formed at the second circumferential end portion 30 is inwardly obliquely protruded toward the first circumferential end portion 20. Furthermore, the temporary engaging ledges 35 and 35 of the second circumferential end portion 30 are radially inwardly extended (not illustrated) so as to be engaged with the temporary engaging protrusions 25 and 25 of the first peripheral end portion 20 to hold the diameter expanded state of the spring body 11.

In this invention, the temporary engaging ledges 35 and 35 can be formed at the first circumferential end portion 20 and the temporary engaging protrusions 25 and 25 can be formed at the second circumferential end portion 30.

Fourth Embodiment

With reference to FIGS. 13A to 16, a fourth embodiment of a component connecting structure according to the present invention will be explained. The same reference numerals as those of the first embodiment will be allotted to substantially the same portions as those of the first embodiment to avoid the cumulative explanation.

Figure 13A:
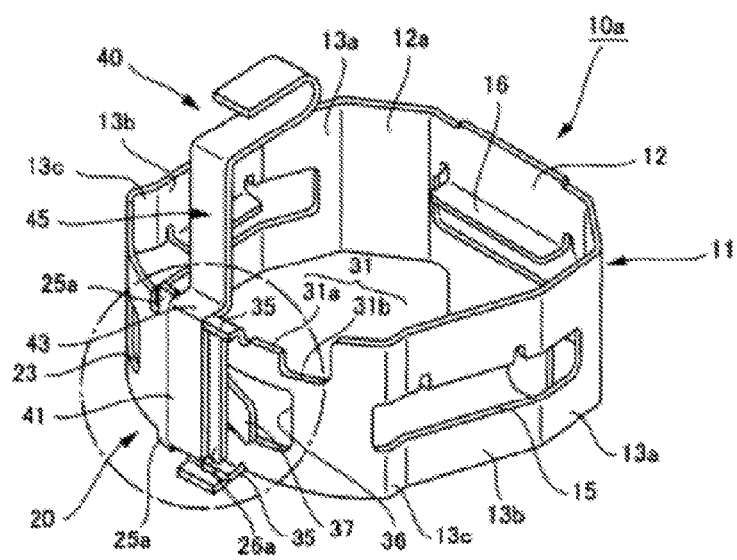
FIG. 13A is a perspective view showing a fourth embodiment of a component connecting structure according to the present invention and FIG. 13B is an enlarged partial view of FIG. 13A.

As shown in FIG. 13A, this embodiment is different from the embodiments shown in FIGS. 1 to 12 in the structure for keeping the clip in a diameter expanded state. In detail, in the clip 10 shown in FIGS. 1 to 12, the diameter expanded state of the clip 10 is held by engaging the temporary engaging ledges 35 and 35 with the temporary engaging protrusions 25 and 25 (see FIGS. 1 and 2). On the other hand, in the clip 10a of this embodiment, the diameter expanded state of the clip 10a is held by engaging the temporary engaging ledges 35 and 35 with the temporary engaging protrusions 25a and 25a via a diameter expanded state holding member 40 as a separate member (see FIG. 13A).

Figure 13B:
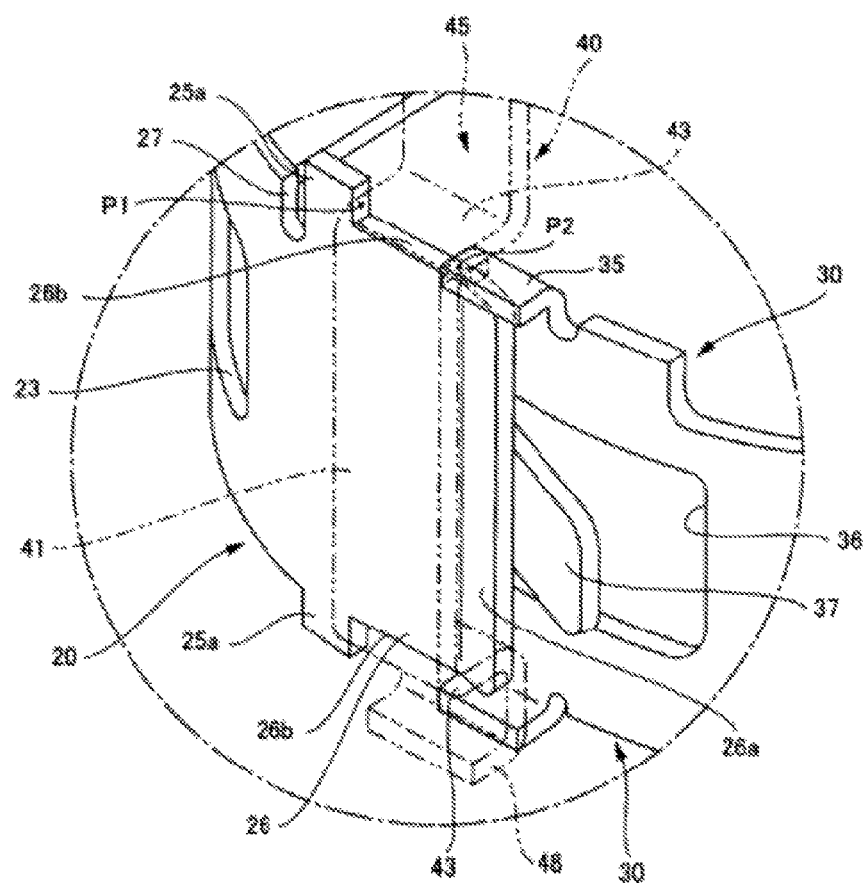
Figure 16:
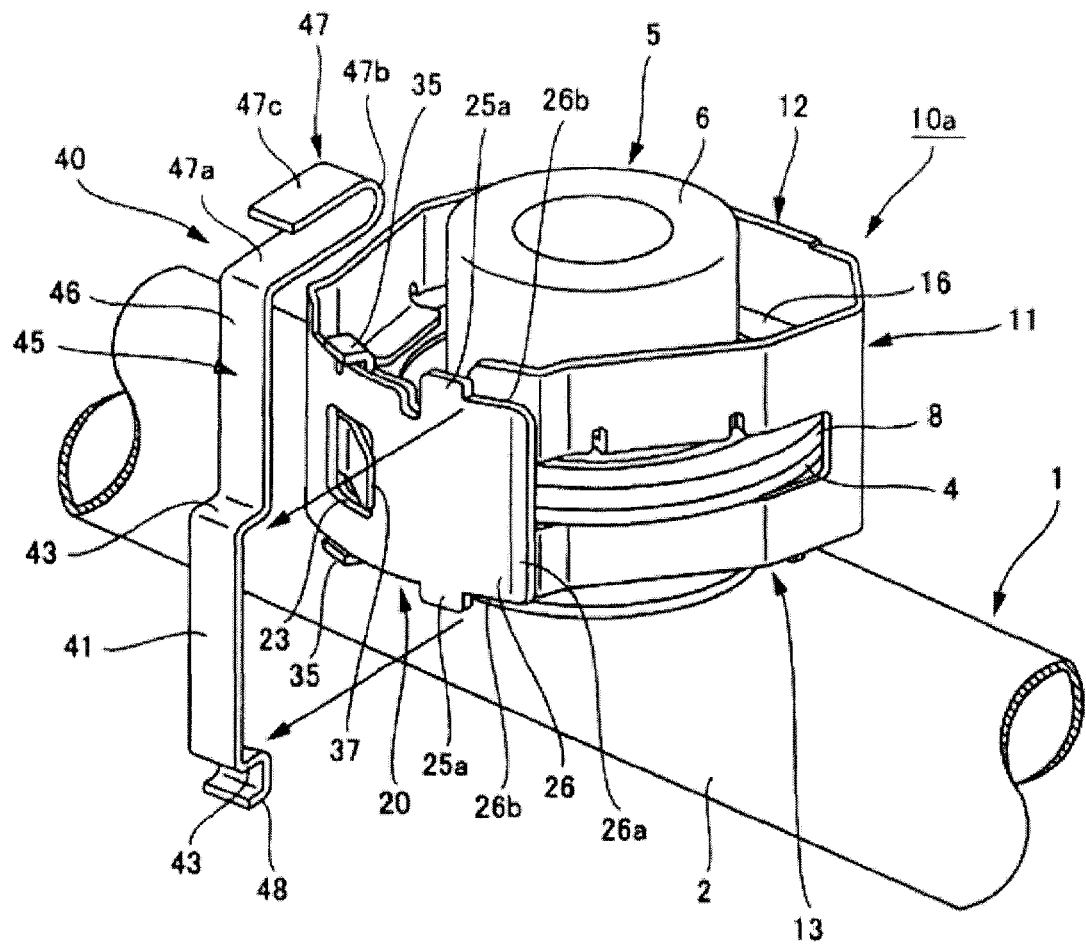
FIG. 16 is a perspective view showing a state in which components are connected using the component connecting structure.

In detail, as shown in FIG. 13B showing the principle portion enlarged perspective view and FIG. 16, at the widthwise both sides of the tip end portion 26 of the first circumferential end portion 20, cut-out portions 26b and 26b extending in the peripheral direction by a certain length is formed, whereby each of the pair of temporary engaging protrusions 25a and 25a has a peripheral length shorter than that of the temporary engaging protrusions 25 shown in FIGS. 1 to 12. Each cut-out portion 26b is configured to be engaged with the inner surface of the engaging portion 43 of the diameter expanded state holding member 40. In this clip 10a, the temporary engaging protrusions 25a and 25a of the first circumferential end portion 20 are axially protruded by a predetermined height from the widthwise sides of the first circumferential end portion 20, and the temporary engaging ledges 35 and 35 of the second circumferential end portion 30 is radially outwardly extended from the widthwise sides of the second circumferential end portion 30 toward the first circumferential end portion 20.

Figure 14:
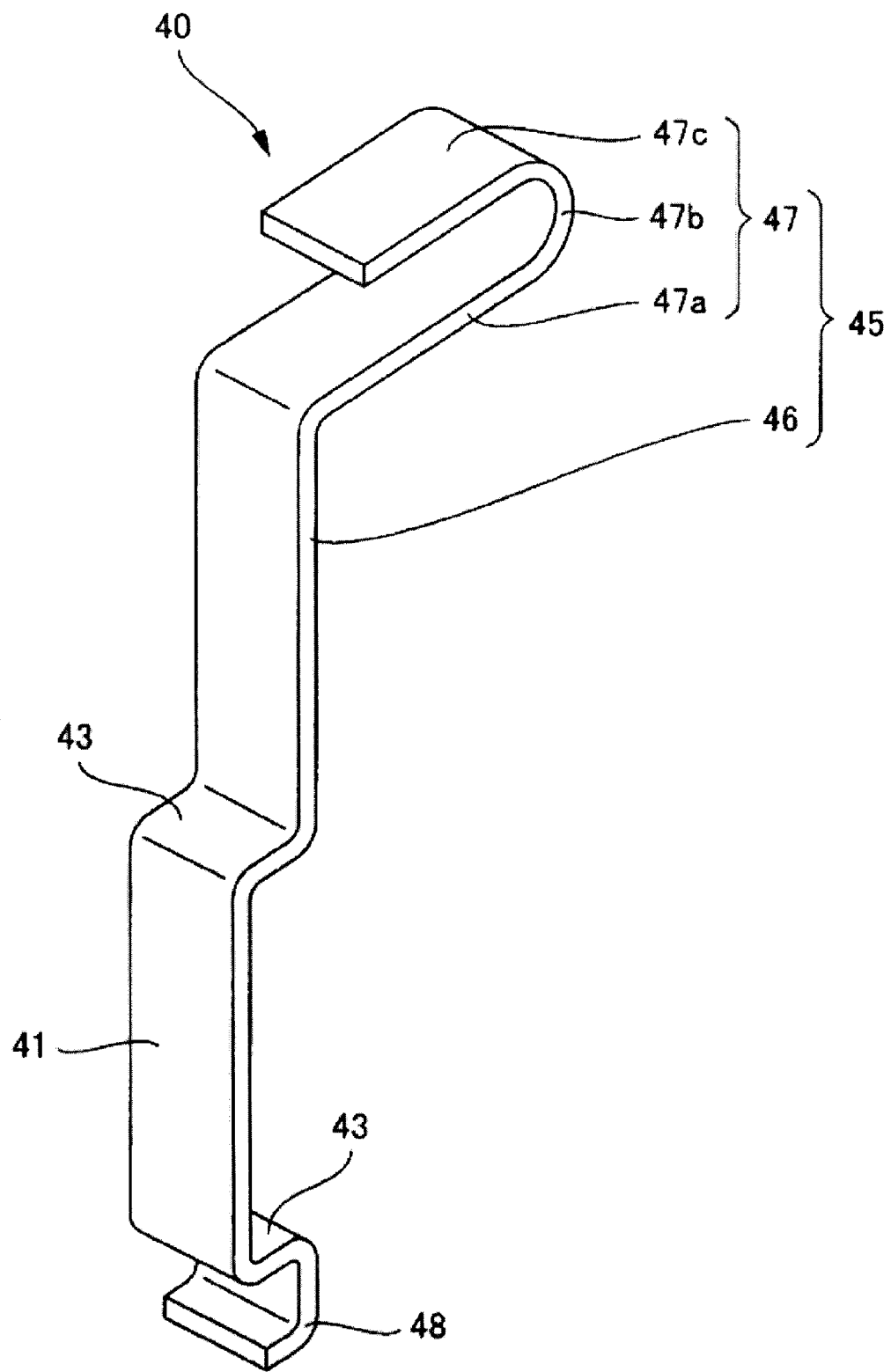
FIG. 14 a perspective view showing a diameter expanded state holding member which is a constituent part of the component connecting structure.

Next, the diameter expanded state holding member 40 to be detachably attached to the spring body 11 with the spring body 11 expanded in diameter will be explained. This diameter expanded state holding member 40 is formed by bending a single elongated metal plate into a predetermined shape. Referring to FIG. 14, the diameter expanded state holding member 40 has a strip-shaped portion 41 having a length approximately equal to the width of the tip end portion 26 of the first circumferential end portion 20 and extending in the width direction of the spring body 11, and engaging portions 43 and 43 extending from the end portions of the strip-shaped portion 41 toward the radially inward direction of the spring body 11 at an approximately right angle with respect to the strip-shaped portion 41.

With the diameter expanded state holding member 40 mounted on the tip end portion 26 of the first circumferential end portion 20, the strip-shaped portion 41 is disposed on the outer surface of the first circumferential end portion 20, and the engaging portions 43 and 43 are engaged with the cut-out portions 26b and 26b formed at both sides of the tip end portion 26. In this state, each temporary engaging protrusion 25a is engaged with one side of the engaging portion 43, and each temporary engaging ledge 35 is engaged with the other side of the engaging portion 43. Thus, the temporary engaging protrusions 25a and 25a and the temporary engaging ledges 35 and 35 are engaged with each other via the diameter expanded state holding member 40 (see FIG. 13A).

As shown in FIG. 14, to one of the engaging portions 43 of the diameter expanded state holding member 40, a releasing portion 45 extending along the axial direction of the spring body 11 is attached. Concretely, this releasing portion 45 is comprised of a base portion 46 extending from the tip end of one of engaging portions 43 approximately in parallel to the strip-shaped portion 41 and having a predetermined length, and a generally U-shaped tip end portion 47 connected to the tip end of the base portion 46. The tip end portion 47 is comprised of an inside portion 47a extending from the tip end of the base portion 46 toward the radially inward direction of the spring body 11 at an approximately right angle with respect to the base portion 46 and having a predetermined length, a bent portion 47b extending from the tip end of the inside portion 47a in a circularly bent manner, and an outside portion 47c extending from the tip end of the bent portion 47b toward the radially outward direction of the spring body 11 approximately in parallel to the inside portion 47a and having a length slightly shorter than that of the inside portion 47a.

Figure 15:
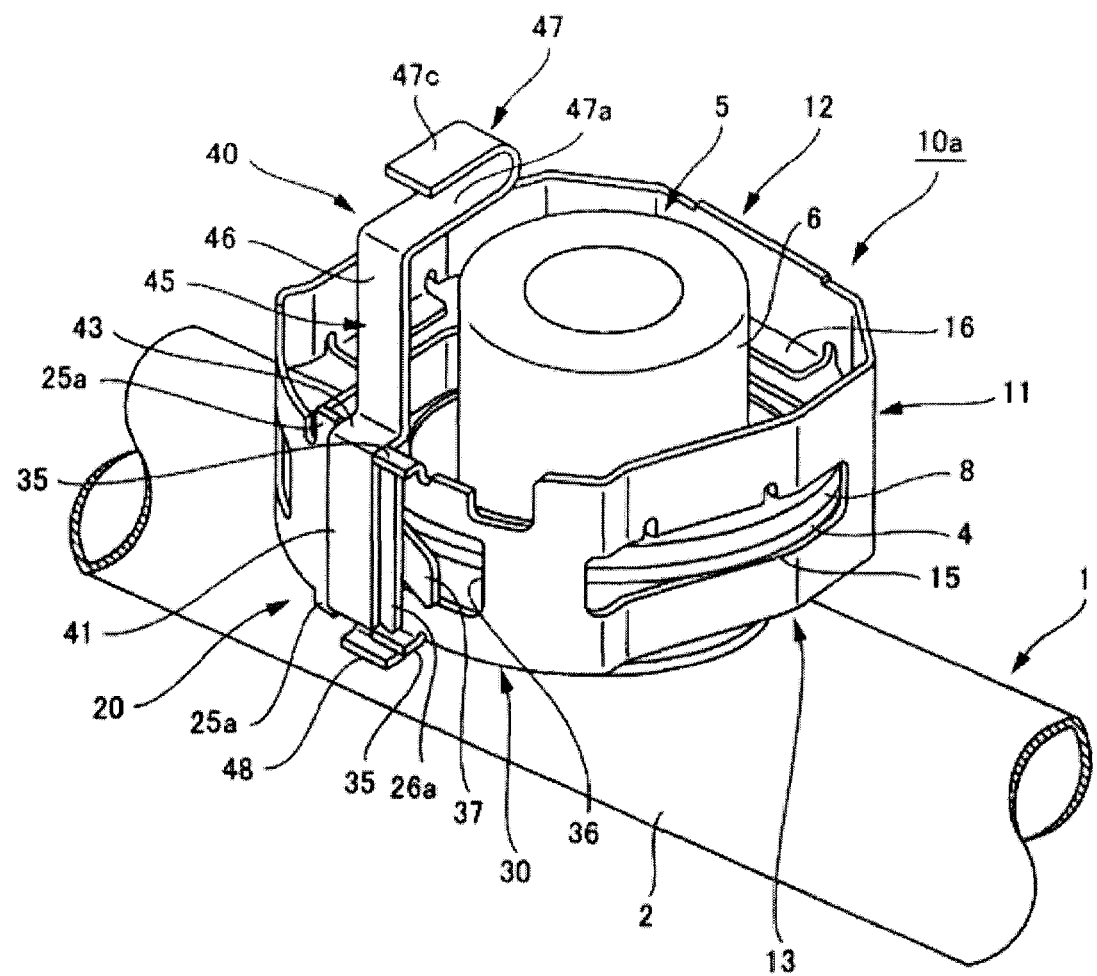
FIG. 15 is a perspective view showing a state before connecting components using the component connecting structure.

This releasing portion 45 is gripped by a user at the time of releasing the diameter expanded state holding member 40 to enhance the releasing of the diameter expanded state holding member 40 from the clip 10a. In detail, as shown in FIG. 15, in detaching the diameter expanded state holding member 40 after setting the clip 10a to the first and second components 1 and 5, the operator can easily hook the inner side of the base portion 46 with fingers or the like since the base portion 46 has a predetermined length. The inside portion 47a of the tip end portion 47 prevents easy detachment of the operator's fingers hooked to the base portion 46, resulting in an enhanced detachment operation of the diameter expanded state holding member 40. Furthermore, since the tip end portion 47 is bent back via the bent portion 47b, the tip end edge portion of the tip end portion 47 (i.e., the tip end face of the outside portion 47c) is prevented from coming into contact with the first component 1 and/or the second component 5, which in turn can prevent possible damages to the components 1 and 5. The outside portion 47c is set to be shorter than the inside portion 47a, which prevents the protrusion of the edge portion of the tip end portion 47 to secure the safety of an operator.

On the other hand, a generally L-shaped bent portion 48 is connected to the other engaging portion 43 of the diameter expanded state holding member 40. This bent portion 48 is extended from the tip end of the other engaging portion 43 approximately in parallel to the strip-shaped portion 41 by a predetermined length and then bent at an approximately right angle with respect to the strip-shaped portion 41 toward the radially outward direction of the spring body 11. This bent portion 48 prevents the tip end edge portion of the other engaging portion 43 from coming into contact with the first component 1 and/or the second component 5 to prevent possible damages to the first component 1 and/or the second component 5.

Next, the method of using the clip 10a having the aforementioned connecting structure will be explained. From the state in which the clip 10a is reduced in diameter with the first circumferential end portion 20 overlapped with the outer surface of the second circumferential end portion 30, the engaging ledge is pulled out of the engaging hole 23 and the spring body 11 is expanded in diameter against the resilient force thereof by approaching the tip end portions of the first and second circumferential end portions 20 and 30 to expand the diameter of the spring body 11 so that the distance between the temporary engaging protrusion 25a and the temporary engaging ledge 35 becomes larger than the width of the diameter expanded state holding member 40. While keeping this diameter expanded state, as shown in FIG. 13A, the engaging portions 43 and 43 of the diameter expanded state holding member 40 are fitted in the cut-out portions 26b and 26b of the tip end portion 26 of the first circumferential end portion 20 to thereby mount the diameter expanded state holding member 40 on the spring body 11.

With this expansion holding member mounted state, the diameter expansion force applied to the spring body 11 against the resilient force is released. As a result, the spring body 11 will reduce in diameter by its resilient force to cause the engagements between the side edges of the temporary engaging protrusions 25a and 25a and the side edges of the engaging portions 43 and 43 and the engagements between the other side edges of the temporary engaging protrusions 25a and 25a and the other side edges of the engaging portions 43 and 43. Thus, the diameter expanded state holding member 40 is mounted on the tip end portion 26 of the first circumferential end portion 20 with the engaging portions 43 and 43 pinched between the temporary engaging protrusions 25a and 25a and between the temporary engaging ledges 35 and 35. As a result, as shown in FIG. 13A, the temporary engaging protrusions 25 and 25 and the temporary engaging ledges 35 and 35 are engaged to thereby temporarily hold the diameter expanded state of the clip 10a.

In this embodiment, the temporary engaging protrusions 25a and 25a are protruded from the widthwise edges of the first circumferential end portion 20 in the widthwise direction thereof. On the other hand, the temporary engaging ledges 35 and 35 are radially outwardly extended from the widthwise edges of the second circumferential end portion 30 toward the first circumferential end portion 20. With this structure, when the diameter expanded state holding member 40 is mounted on the spring body 11 as mentioned above, as shown in the principal portion enlarged view of FIG. 13B, the opposed portions P1 and P2 of the temporary engaging protrusion 25a and the temporary engaging ledge 35 linearly come into contact with both sides of each engaging portion 43 of the diameter expanded state holding member 40. This does not cause a rotation moment of the diameter expanded state holding member 40 due to the pressing forces by the temporary engaging protrusion 25a and the temporary engaging ledge 35, which in turn can prevent the diameter expanded state holding member 40 from being twisted. Thus, the detachment of the first and second circumferential end portions 20 and 20 can be prevented.

Furthermore, in this embodiment, the engaging portion 43 radially inwardly extended is formed on the diameter expanded state holding member 40 so that the engaging portion 43 can be engaged with the temporary engaging protrusion 25a and the temporary engaging ledge 35. This enlarges the engaging range in which the temporary engaging protrusion 25a and the temporary engaging ledge 35 can be engaged with the engaging portion 43. With this structure, even if the temporary engaging protrusion 25a or the temporary engaging ledge 35 is slightly shifted in the radial direction, the temporary engaging protrusion 25a or the temporary engaging ledge 35 would hardly be disengaged from the engaging portion 43, resulting in stable holding of the diameter expanded state of the spring body 11.

With this state, as shown in FIG. 15, the flange portion 4 of the first component 1 and the flange portion 8 of the second composition 5 are butted against each other and then the clip 10a is disposed on the outer peripheries of both the components 1 and 5 with each slit 15 of the clip 10a temporarily expanded in diameter aligned with the butted flange portions 4 and 8. Thereafter, as shown in FIG. 16, the releasing portion 45 of the diameter expanded state holding member 40 is pulled with fingers in the radially outward direction of the spring body 11. As a result, the engaging portions 43 and 43 will be detached from the cut-out portions 26b and 26b of the first circumferential end portion 20 and the engaging portions 43 and 43 will be pulled out from between the temporary engaging protrusion 25a and the temporary engaging ledge 35. Thus, the diameter expanded state holding member 40 is detached from the spring body 11. As a result, the engagement between the temporary engaging protrusion 25a and the temporary engaging ledge 35 will be released, causing diameter reduction of the spring body 11 by its resilient force. This causes insertion of the flange portions 4 and 8 into each slit 15 to fix both the components 1 and 5 with the clip 10a.

According to this embodiment, the diameter expanded state of the spring body 11 is held with the engaging portions 43 and 43 pinched by and between the temporary engaging protrusion 25a and the temporary engaging ledge 35. Thus, the temporary engaging protrusion 25a and the temporary engaging ledge 35 are forcibly pressed against both sides of the engaging portions 43 and 43, resulting in secure mounting of the diameter expanded state holding member 40 to the spring body 11, which hardly causes detachment of the diameter expanded state holding member 40 from the spring body 11 and assuredly hold the diameter expanded state of the spring body 11. As a result, even if vibrations and/or external forces are applied to the clip 10a during the transportation thereof, the diameter expanded state of the clip 10a can be assuredly held. Therefore, in a factory or the like, the clip 10a can be transported in a diameter expanded state. This eliminates the diameter expansion operation of the clip 10a by a user at an assembling site, enabling an easy coupling operation of the components 1 and 5 using the clip 10a.

In this embodiment, since the releasing portion 45 is provided at one of the engaging portions 43 of the diameter expanded state holding member 40, the releasing portion 45 can be pulled radially outwardly with fingers at the time of detaching the diameter expanded state holding member 40, which improves the releasing operation of the diameter expanded state holding member 40. Furthermore, the tip end portion 47 of the releasing portion 45 is formed to have an approximately U-shape and is provided with a bent portion 47b at the radially inward side of the spring body 11. Therefore, when the diameter expanded state holding member 40 is detached from the spring body 11, the bent portion 47b is prevented from coming into contact with the first component 1 or the second component 5, and the edge portion of the tip end portion 47 is prevented from coming into contact with the components 1 and 5. As a result, possible damages of the components 1 and 5 can be restrained.

Furthermore, in this embodiment, since a generally L-shaped bent portion 48 is provided at the other engaging portion 43 of the diameter expanded state holding member 40, in the same manner as in the tip end portion 47 of the U-shaped releasing portion 45, when the diameter expanded state holding member 40 is detached from the spring body 11, the portion of the bent portion 48 parallel to the strip-shaped portion 41 is prevented from coming into contact with the first component 1 or the second component 5, and the edge portion of the tip end portion is prevented from coming into contact with the components 1 and 5. As a result, possible damages of the components 1 and 5 can be restrained.

Fifth Embodiment

Figure 17:
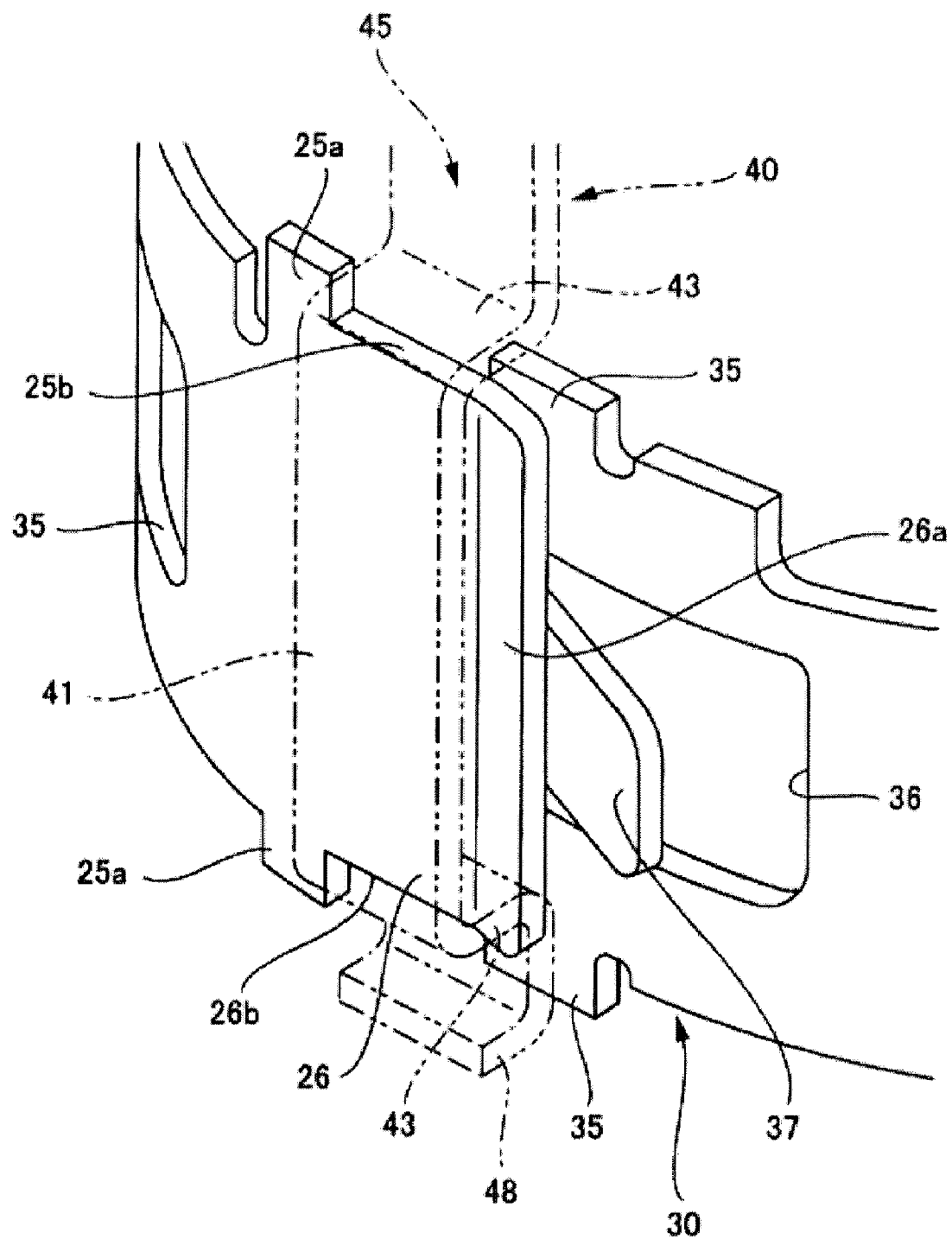
FIG. 17 is a partially enlarged perspective view showing a principle portion of a component connecting structure according to a fifth embodiment of the present invention.

FIG. 17 shows a fourth embodiment of a component connecting structure according to the present invention. The same reference numerals as those of the first embodiment will be allotted to substantially the same portions as those of the first embodiment to avoid the cumulative explanation.

In the fourth embodiment shown in FIGS. 13A to 16, the temporary engaging ledges 35 and 35 of the second circumferential end portion 30 are bent radially outwardly toward the first circumferential end portion 20. To the contrary, in this embodiment, the temporary engaging ledges 35 and 35 are protruded from the widthwise sides of the second circumferential end portion 30 in the widthwise direction by a predetermined height.

In this embodiment too, as shown in FIG. 17, the clip 10a can be held in a diameter expanded state by engaging the engaging portions 43 and 43 with the cut-out portions 26b and 26b and engaging the temporary engaging protrusion 25a and the temporary engaging ledge 35 each other via the diameter expanded state holding member 10 with the side of the temporary engaging protrusion 25a engaged with one side of the engaging portion 43 and with the other side of the temporary engaging protrusion 25a engaged with the other side of the engaging portion 43.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A component connecting structure, comprising a first component having a flange portion, a second component having a flange portion, and a clip holding both the flange portions in a butted manner so as not to be detached from each other, wherein the clip is formed into a generally polygonal hollow tube shape by bending an elongated plate spring body at plural folding lines such that the spring body comprises circumferential side walls, each of the side walls comprising a first circumferentially extending edge at a first open end of the hollow tube shape and a second circumferentially extending edge at a second open end of the hollow tube shape opposite to the first open end in an axial direction of the hollow tube shape, and the spring body comprises a first circumferential end portion and a second circumferential end portion, the second circumferential end portion being overlapped with the first circumferential end portion by a predetermined length along a circumferential direction to have a closed shape in a diameter reduced free state of the clip, wherein the first circumferential end portion is provided with a temporary engaging protrusion extended from at least one of the first circumferentially extending edge and the second circumferentially extending edge, and the second circumferential end portion is provided with a temporary engaging ledge extended from at least one of the first circumferentially extending edge and the second circumferentially extending edge, wherein the temporary engaging protrusion and the temporary engaging ledge are directly or indirectly engaged with each other when the spring body is expanded in diameter to hold a diameter expanded state of the spring body such that the spring body has a closed shape in the diameter expanded state, wherein at least two of the side walls respectively comprise a circumferentially extending slit between the first circumferentially extending edge and the second circumferentially extending edge wherein the slit is disposed away from the first circumferentially extending edge and the second circumferentially extending edge and wherein the slit comprises a first circumferentially extending side edge and a second circumferentially extending side edge spaced from and opposite to the first circumferentially extending side edge in the axial direction, wherein the at least two of the side walls comprising the slits respectively comprise a third circumferentially extending edge defining the first circumferentially extending side edge of the slit, and a fourth circumferentially extending edge defining the second circumferentially extending side edge of the slit, and wherein the at least two of the side walls comprising the slits respectively comprise a circumferentially extending projection which extends radially inward at the third circumferentially extending edge thereof such that the spring body includes a cross section as viewed from the axial direction of the hollow tube shape in the diameter expanded state such that the inner circumferential shape of the spring body at the third circumferentially extending edge of the side walls does not allow passing of the flange portions in the axial direction and the inner circumferential shape of the spring body at the fourth circumferentially extending edge of the side walls allows passing of the flange portions in the axial direction, and wherein the flange portions are received in the slits in the diameter reduced free state of the clip.

2. The component connecting structure as recited in claim 1, wherein a protruded ledge is radially inwardly extended from the third circumferentially extending edge of the side wall, and wherein the protruded ledge has a protruded height which does not allow passing of the flange portions in the diameter expanded state of the spring body with the temporary engaging protrusion engaged with the temporary engaging ledge and does not cause pressing of the protruded ledge against an outer periphery of a main body of the component in a diameter reduced state of the spring body.

3. The component connecting structure as recited in claim 1, wherein a protruded ledge is radially outwardly extended from the third circumferentially extending edge of the side wall, and wherein a width between the protruded ledge and the second side edge of the slit is set to be smaller than a width between both side edges of the slit.

4. The component connecting structure as recited in claim 1, wherein the component connecting structure further comprises a diameter expanded state holding member configured to be pinched by and between the temporary engaging protrusion and the temporary engaging ledge in the diameter expanded state of the spring body and to be detachably attached to the spring body.

5. The component connecting structure as recited in claim 4, wherein one of the first circumferential end portion and the second circumferential end portion is provided with an engaging hole, and wherein the other of the first circumferential end portion and the second circumferential end portion is provided with an engaging ledge protruded in a direction toward the one of the first circumferential end portion and the second circumferential end portion and in a direction getting away from a tip end portion of the other circumferential end portion, the engaging ledge being configured to be inserted in the engaging hole when the spring body is reduced in diameter.

6. The component connecting structure as recited in claim 5, wherein the one of the first circumferential end portion and the second circumferential end portion is disposed on an outer peripheral side of the other of the first circumferential end portion and the second circumferential end portion, and wherein the engaging ledge is formed so as to outwardly protrude from an end portion of the one of the first circumferential end portion and the second circumferential end portion in a state in which the spring body is expanded in diameter with the temporary engaging protrusion engaged with the temporary engaging ledge via the diameter expanded state holding member.

7. The component connecting structure as recited in claim 4, wherein the temporary engaging ledge is provided at each of both the first circumferentially extending edge and the second circumferentially extending edge of the second circumferential end portion, and wherein a portion of the first circumferential end portion where the temporary engaging ledges are positioned in a diameter reduced state of the spring body is formed to have a width between the first circumferentially extending edge and the second circumferentially extending edge capable of being inserted between the temporary engaging ledges.

8. The component connecting structure as recited in claim 4, wherein a protruded ledge is radially inwardly extended from the third circumferentially extending edge of the side wall, and wherein the protruded ledge has a protruded height which does not allow passing of the flange portions in the diameter expanded state of the spring body with the temporary engaging protrusion engaged with the temporary engaging ledge via the diameter expanded state holding member and does not cause pressing of the protruded ledge against an outer periphery of a main body of the component in a diameter reduced state of the spring body.

9. The component connecting structure as recited in claim 4, wherein a protruded ledge is radially outwardly extended from the third circumferentially extending edge of the side wall, and wherein a width between the protruded ledge and the second side edge of the slit is set to be smaller than a width between both side edges of the slit.

10. The component connecting structure as recited in claim 4, wherein the temporary engaging protrusion is outwardly extended from at least one of the first circumferentially extending edge and the second circumferentially extending edge of the first circumferential end portion, and wherein the temporary engaging ledge is radially inwardly or radially outwardly extended from at least one of the first circumferentially extending edge and the second circumferentially extending edge of the second circumferential end portion toward the first circumferential end portion.

11. The component connecting structure as recited in claim 4, wherein the diameter expanded state holding member includes a strip-shaped portion extending in a widthwise direction of the spring body along the axial direction of the hollow tube shape, and engaging portions radially inwardly extended from both end portions of the strip-shaped portion and configured to be engaged with the temporary engaging protrusion and the temporary engaging ledge.

12. The component connecting structure as recited in claim 11, wherein the diameter expanded state holding member further includes a releasing portion extended from one of the engaging portions of the diameter expanded state holding member along the axial direction of the hollow tube shape, and wherein a tip end of the releasing portion is bent in a radially inward direction of the spring body and then bent back in a radially outward direction of the spring body.

13. The component connecting structure as recited in claim 11, wherein the diameter expanded state holding member further includes a bent portion extended from one of the engaging portions of the diameter expanded state holding member along the axial direction of the hollow tube shape and then bent in a radially outward direction of the spring body.

14. The component connecting structure as recited in claim 4, wherein a protruded ledge is radially inwardly extended from the third circumferentially extending edge of the side wall, and wherein the protruded ledge has a protruded height which does not allow passing of the flange portions in the diameter expanded state of the spring body with the temporary engaging protrusion engaged with the temporary engaging ledge and does not cause pressing of the protruded ledge against an outer periphery of a main body of the component in a diameter reduced state of the spring body.

* * * * *